(12) United States Patent
Kim et al.

(10) Patent No.: US 11,788,520 B2
(45) Date of Patent: Oct. 17, 2023

(54) LINEAR COMPRESSOR

(71) Applicant: LG ELECTRONICS INC., Seoul (KR)

(72) Inventors: Jaebeum Kim, Seoul (KR); Sangsub Jeong, Seoul (KR); Sanga Park, Seoul (KR)

(73) Assignee: LG Electronics Inc., Seoul (KR)

( * ) Notice: Subject to any disclaimer, the term of this patent is extended or adjusted under 35 U.S.C. 154(b) by 99 days.

(21) Appl. No.: 17/476,743

(22) Filed: Sep. 16, 2021

(65) Prior Publication Data

US 2022/0154708 A1 May 19, 2022

(30) Foreign Application Priority Data

Nov. 13, 2020 (KR) .................. 10-2020-0152007

(51) Int. Cl.
*F04B 35/04* (2006.01)
*H02K 33/16* (2006.01)
*H02K 33/18* (2006.01)

(52) U.S. Cl.
CPC ........... *F04B 35/045* (2013.01); *H02K 33/16* (2013.01); *H02K 33/18* (2013.01); *H02K 2201/12* (2013.01)

(58) Field of Classification Search
CPC ...... F04B 35/045; H02K 33/16; H02K 33/00; H02K 33/18; H02K 2201/12
See application file for complete search history.

(56) References Cited

U.S. PATENT DOCUMENTS 5,632,609 A * 5/1997 Hashimoto ......... F04B 39/1073
137/856
2005/0057101 A1* 3/2005 Nakagawa ............. H02K 33/16
310/12.24
(Continued)

FOREIGN PATENT DOCUMENTS

| CN | 201708678 | 1/2011 |
|---|---|---|
| EP | 3358727 | 8/2018 |
| EP | 3691097 | 8/2020 |

(Continued)

OTHER PUBLICATIONS

Extended European Search Report in European Appln. No. 21196901.9, dated Feb. 2, 2022, 7 pages.

(Continued)

*Primary Examiner* — Kenneth J Hansen
*Assistant Examiner* — David N Brandt
(74) *Attorney, Agent, or Firm* — Fish & Richardson P.C.

(57) ABSTRACT

A linear compressor includes a frame; an outer stator including a stator core disposed on the frame, a teeth portion extending inward from the stator core, and a teeth shoe extending in a circumferential direction from an inner end of the teeth portion; a coil disposed on the teeth portion; a cylinder disposed on the frame; a piston disposed in the cylinder; an inner stator coupled to an outer circumferential surface of the piston, and reciprocating in an axial direction by electromagnetic interaction with the coil; a magnet disposed on the teeth shoe and facing the inner stator; and a virtual pole disposed on the teeth shoe, disposed in front or behind in an axial direction of the magnet, and facing the inner stator. The outer stator includes a plurality of core plates stacked in the axial direction.

14 Claims, 18 Drawing Sheets

(56) References Cited

U.S. PATENT DOCUMENTS

2018/0219444 A1* 8/2018 Kim .................. H02K 7/14
2019/0245425 A1* 8/2019 Kim .................. H02K 1/17

FOREIGN PATENT DOCUMENTS

| | | |
|---|---|---|
| JP | 2005328655 | 11/2005 |
| KR | 101484324 | 1/2015 |
| KR | 2018-0000602 | 1/2018 |
| KR | 2018-0089746 | 8/2018 |
| KR | 2018-0091461 | 8/2018 |
| KR | 20190095807 | 8/2019 |

OTHER PUBLICATIONS

Notice of Allowance in Korean Appln. No. 10-2020-0152007, dated Nov. 3, 2022, 6 pages (with English Abstract).
Notice of Allowance in Korean Appln. No. 10-2020-0152007, dated Nov. 3, 2022, 6 pages (with English translation).

* cited by examiner

ID No. 10-2020-0152007 filed in the
LINEAR COMPRESSOR

CROSS-REFERENCE TO RELATED APPLICATION

This application claims priority to and the benefit of Korean Patent Application No. 10-2020-0152007 filed in the Korean Intellectual Property Office on Nov. 13, 2020, the entire contents of which are incorporated herein by reference.

BACKGROUND OF THE INVENTION

Field of the Invention

The present disclosure relates to a linear compressor. In more detail, the present disclosure relates to a linear compressor including a transverse flux type reciprocating motor in which a direction of flux and a direction of linear reciprocating movement of a piston form a right angle.

Description of the Related Art

In general, compressors refer to a device configured to compress a working fluid such as air or a refrigerant by receiving power from a power generating device such as a motor or a turbine. Specifically, the compressors are widely applied to the entire industry or home appliances, in particular, a vapor compression type refrigerating cycle (hereinafter, referred to as a "refrigerating cycle"), and the like.

These compressors may be classified into a reciprocating compressor, a rotary compressor, and a scroll compressor depending on a method of compressing a refrigerant.

The reciprocating compressor is a method of compressing fluid by forming a compression space between a piston and a cylinder and by linearly reciprocating motion of the piston, the rotary compressor is a method of compressing fluid by eccentrically rotating rollers inside a cylinder, and the scroll compressor is a method of compressing fluid by rotating a pair of spiral scrolls.

Recently, among the reciprocating compressors, the use of a linear compressor using a linear reciprocating motion without using a crankshaft is gradually increasing. The linear compressor has advantages of having a relatively simple structure and improving the efficiency of the compressor because there is little mechanical loss in converting rotational motion to linear reciprocating motion.

The linear compressor is configured such that a cylinder is positioned inside a casing forming a closed space to form a compression chamber, and a piston covering the compression chamber reciprocates inside the cylinder. In the linear compressor, processes, in which fluid in the closed space is sucked into the compression chamber in the process of positioning the piston at a bottom dead center (BDC), and the fluid in the compression chamber is compressed and discharged in the process of positioning the piston at a top dead center (TDC), are repeated.

A compression unit and a driving unit are respectively installed inside the linear compressor, and the compression unit performs a process of compressing and discharging the refrigerant while performing a resonant motion by a resonance spring through the movement generated in the driving unit.

The piston of the linear compressor sucks the refrigerant into the casing through the suction pipe while reciprocating at high speed inside the cylinder by the resonance spring, and then repeatedly performs a series of processes that are being discharged from the compressed space by the forward motion of the piston and moving to a condenser through the discharge pipe.

On the other hand, the linear compressor may be classified into an oil lubricated linear compressor and a gas type linear compressor according to a lubrication method.

The oil lubricated linear compressor is configured to lubricate between the cylinder and the piston by using a certain amount of oil that is stored inside the casing.

On the other hand, the gas lubricated linear compressor is configured to lubricate between the cylinder and the piston with the gas force of the refrigerant by inducing a part of the refrigerant discharged from the compression space between the cylinder and the piston without storing the oil in the casing.

The oil lubricated linear compressor, as oil having a relatively low temperature is supplied between the cylinder and the piston, can suppress overheating of cylinders and pistons due to motor heat or compression heat. Through this, the oil lubricated linear compressor can prevent the occurrence of suction loss in advance by suppressing an increase in specific volume due to heating while the refrigerant passing through the suction flow path of the piston is sucked into the compression chamber of the cylinder.

However, in the oil lubricated linear compressor, if the oil discharged to the refrigerating cycle device along with the refrigerant is not smoothly recovered to the compressor, oil shortage may occur inside the casing of the compressor, and the oil shortage in the casing may cause the reliability of the compressor to deteriorate.

On the other hand, the gas lubricated linear compressor is advantageous in that it can be miniaturized compared to the oil lubricated linear compressor, and the reliability of the compressor due to oil shortage does not deteriorate because the refrigerant lubricates between the cylinder and the piston.

On the other hand, the conventional transverse magnetic flux type reciprocating motor requires a larger amount of coils compared to the longitudinal linear motor in order to produce the same output as the longitudinal linear motor. In this case, there is a problem in that the height of the linear compressor is increased as the outer diameter of the transverse magnetic flux type reciprocating motor is increased.

In addition, the conventional transverse magnetic flux type reciprocating motor has a problem in that there are limitations on mechanical stress limit and vibration distance as the mechanical resonance spring of compression coil spring is installed. In addition, due to the characteristics of the compression coil spring, the mover is eccentric by a lateral force, so that there is a problem that friction loss with the stator occurs.

PRIOR TECHNICAL LITERATURE (Patent Document 1) Korean Patent Publication No. 10-1484324 B (published on Jan. 20, 2015)

SUMMARY

The problem to be solved by the present disclosure is to provide a linear compressor capable of reducing a height of the linear compressor by reducing an outer diameter of a transverse magnetic flux type reciprocating motor.

In addition, it is to provide a linear compressor capable of solving limitations on mechanical stress limit and vibration distance by removing a mechanical resonance spring.

In addition, it is to provide a linear compressor capable of reducing friction loss with a stator generated by eccentricity of a mover by a lateral force.

In addition, it is to provide a linear compressor capable of improving efficiency of magnetic interaction between a magnet and a piston while using a small amount of magnet.

In addition, it is to provide a linear compressor capable of improving stability of magnetic interaction between a magnet and a piston.

In addition, it is to provide a linear compressor capable of improving stability of an axial reciprocating motion of an inner stator and a piston as a mover.

In addition, it is to provide a linear compressor capable of preventing an operator's error that occurs in a process of assembling products.

In addition, it is to provide a linear compressor capable of reducing the cost incurred in a process of assembling products.

In addition, it is to provide a linear compressor capable of improving an axial movement stroke of an inner stator and a piston as a mover while using a small amount of the magnet.

In addition, it is to provide a linear compressor capable of stably reciprocating a piston in the axial direction without any means such as a separate bearing for floating the piston inside the cylinder.

In addition, it is to provide a linear compressor capable of preventing interference of the cylinder to the electromagnetic interaction between the coil and the inner stator.

A linear compressor according to an aspect of the present disclosure for achieving the above object comprises a frame, an outer stator including a stator core disposed on the frame, a teeth portion extending inward from the stator core, and a teeth shoe extending in a circumferential direction from an inner end of the teeth portion, a coil disposed on the teeth portion, a cylinder disposed on the frame, a piston disposed in the cylinder, an inner stator coupled to an outer circumferential surface of the piston, and reciprocating in an axial direction by electromagnetic interaction with the coil, a magnet disposed on the teeth shoe and facing the inner stator, and a virtual pole disposed on the teeth shoe, disposed in front or behind in an axial direction of the magnet, and facing the inner stator.

Through this, it is possible to solve the limitation on the mechanical stress limit and the vibration distance by removing the mechanical resonance spring. In addition, it is possible to reduce the friction loss with the cylinder, which is the stator, which is generated by eccentricity of the piston, which is the mover, by the lateral force.

In addition, the outer stator may comprise a plurality of core plates stacked in the axial direction. Through this, since the outer stator is stacked in the axial direction, it is possible to increase the amount of coils disposed in the teeth portion of the outer stator. That is, when the same amount of coils is used, the height of the linear compressor can be reduced by reducing the outer diameter of the transverse magnetic flux type reciprocating motor.

In addition, the coil may comprise a plurality of coils spaced apart in the circumferential direction and formed in an even number, and each of the plurality of coils may have magnetic fluxes formed in opposite directions to neighboring coils in the circumferential direction. Through this, the inner stator and the piston can stably reciprocate in the axial direction.

In addition, the coil may comprise a plurality of coils spaced apart in the circumferential direction and formed in an even number, and each of the plurality of coils may be disposed radially with respect to a central area of the outer stator. Through this, it is possible to improve the stability of the axial direction reciprocating motion of the inner stator and the piston.

In addition, the teeth shoe may comprise first to fourth teeth shoes spaced apart in the circumferential direction, and the magnet may comprise first to fourth magnets disposed on an inner surface of each of the first to fourth teeth shoes. Through this, it is possible to improve the stability of the magnetic interaction between the magnet and the piston.

In this case, the virtual pole may comprise a first virtual pole disposed on the inner surface of the first teeth shoe and disposed behind the first magnet, a second virtual pole disposed on the inner surface of the second teeth shoe and disposed in front of the second magnet, a third virtual pole disposed on the inner surface of the third teeth shoe and disposed behind the third magnet, and a fourth virtual pole disposed on the inner surface of the fourth teeth shoe and disposed in front of the fourth magnet. Through this, it is possible to improve the efficiency of the magnetic interaction between the magnet and the piston while using a small amount of the magnet.

In addition, the first to fourth magnets may have the same polarity. Through this, it is possible to prevent an operator's error that may occur in the process of disposing the first to fourth magnets on the first to fourth teeth shoes, respectively.

In addition, an axial length of the inner stator may correspond to an axial length of the magnet. Through this, it is possible to maximize the efficiency of the magnetic interaction of the inner stator for the magnet.

In addition, the virtual pole may be formed integrally with the teeth shoe. Through this, it is possible to reduce the cost of combining the virtual pole to the teeth shoe.

In addition, an axial length of the virtual pole may be formed longer than an axial length of the magnet. Through this, it is possible to improve the efficiency of the magnetic interaction between the virtual pole and the piston while using a small amount of the magnet.

In addition, a radial length of the virtual pole may correspond to a radial length of the magnet.

In addition, a sum of an axial length of the magnet and an axial length of the virtual pole may be less than an axial length of the outer stator. Through this, it is possible to improve the stroke of the inner stator and the piston while using a small amount of the magnet.

In addition, the present disclosure may further include a stator cover coupled to rear of the outer stator, and an elastic member connecting the piston and the stator cover. Through this, it is possible to stably reciprocate the piston in the axial direction without a means such as a separate bearing for floating the piston inside the cylinder.

In addition, the cylinder may not radially overlap the inner stator and the outer stator. Through this, it is possible to prevent the cylinder from interfering with the electromagnetic interaction between the coil and the inner stator.

A linear compressor according to an aspect of the present disclosure for achieving the above object comprise a frame, an outer stator including a stator core disposed on the frame, a teeth portion extending inward from the stator core, and a teeth shoe extending in a circumferential direction from an inner end of the teeth portion, a coil disposed on the teeth portion, a cylinder disposed on the frame, a piston disposed in the cylinder, an inner stator coupled to an outer circumferential surface of the piston and reciprocating in an axial direction by electromagnetic interaction with the coil, and a magnet disposed on the teeth shoe and facing the inner stator.

In this case, the teeth shoe may comprise a step portion formed on an inner surface, the magnet may be disposed on the step portion, and the inner surface of the teeth shoe may be a magnetic material, and may be disposed in front or behind in an axial direction of the magnet.

Through this, it is possible to solve the limitation on the mechanical stress limit and the vibration distance by removing the mechanical resonance spring. In addition, it is possible to reduce the friction loss with the cylinder, which is the stator, which is generated by eccentricity of the piston, which is the mover, by the lateral force. In addition, since the virtual pole, which is a magnetic material, corresponds to the inner surface of the teeth shoe, it is possible to reduce the cost of combining it with the teeth shoe by separately manufacturing the virtual pole.

In addition, the outer stator may comprise a plurality of core plates stacked in the axial direction. Through this, since the outer stator is stacked in the axial direction, it is possible to increase the amount of coils disposed in the teeth portion of the outer stator. That is, when the same amount of coils is used, the height of the linear compressor can be reduced by reducing the outer diameter of the transverse magnetic flux type reciprocating motor.

In addition, the teeth shoe may comprise first to fourth teeth shoes spaced apart in the circumferential direction, each of the first to fourth teeth shoes may comprise first to fourth step portions formed on an inner surface thereof, and the magnet may comprise first to fourth magnets disposed on each of the first to fourth step portions. Through this, it is possible to improve the stability of the magnetic interaction between the magnet and the piston.

In addition, the first step portion may be formed in a front area of the inner surface of the first teeth shoe, the second step portion may be formed in a rear area of the inner surface of the second teeth shoe, the third step portion may be formed in a front area of the inner surface of the third teeth shoe, and the fourth step portion may be formed in a rear area of the inner surface of the fourth teeth shoe. Through this, it is possible to improve the efficiency of the magnetic interaction between the magnet and the piston while using a small amount of the magnet.

In addition, the first to fourth magnets may have the same polarity. Through this, it is possible to prevent an operator's error that may occur in the process of disposing the first to fourth magnets on the first to fourth step portions, respectively.

A linear compressor according to an aspect of the present disclosure for achieving the above object comprise a frame, an outer stator including a stator core disposed on the frame, a teeth portion extending inward from the stator core, and a teeth shoe extending in a circumferential direction from an inner end of the teeth portion, a coil disposed on the teeth portion, a cylinder disposed on the frame, a piston disposed in the cylinder, an inner stator coupled to an outer circumferential surface of the piston and reciprocating in an axial direction by electromagnetic interaction with the coil, and a magnet disposed on an inner surface of the teeth shoe and facing the inner stator.

In this case, the teeth shoe may comprise a protrusion formed on the inner surface, the protrusion may be a magnetic material, and may be disposed in front or behind in an axial direction of the magnet.

Through this, it is possible to solve the limitation on the mechanical stress limit and the vibration distance by removing the mechanical resonance spring. In addition, it is possible to reduce the friction loss with the cylinder, which is the stator, which is generated by eccentricity of the piston, which is the mover, by the lateral force. In addition, since the virtual pole, which is a magnetic material, corresponds to the protrusion of the teeth shoe, it is possible to reduce the cost of combining it with the teeth shoe by separately manufacturing the virtual pole.

In addition, the outer stator may comprise a plurality of core plates stacked in the axial direction. Through this, since the outer stator is stacked in the axial direction, it is possible to increase the amount of coils disposed in the teeth portion of the outer stator. That is, when the same amount of coils is used, the height of the linear compressor can be reduced by reducing the outer diameter of the transverse magnetic flux type reciprocating motor.

In addition, the teeth shoe may comprise first to fourth teeth shoes spaced apart in the circumferential direction, and the magnet may comprise first to fourth magnets disposed on an inner surface of each of the first to fourth teeth shoes. Through this, it is possible to improve the stability of the magnetic interaction between the magnet and the piston.

In addition, each of the first to fourth teeth shoes may comprise first to fourth protrusions on the inner surface thereof, the first protrusion may be formed in a rear area of the inner surface of the first teeth shoe, the second protrusion may be formed in a front area of the inner surface of the second teeth shoe, the third protrusion may be formed in a rear area of the inner surface of the third teeth shoe, and the fourth protrusion may be formed in a front region of the inner surface of the fourth teeth shoe. Through this, it is possible to improve the efficiency of the magnetic interaction between the magnet and the piston while using a small amount of the magnet.

Through the present disclosure, it is possible to provide a linear compressor capable of reducing the outer diameter of the transverse magnetic flux type reciprocating motor and reducing the height of the linear compressor.

In addition, it is possible to provide a linear compressor capable of solving the limitation on the mechanical stress limit and the vibration distance by removing the mechanical resonance spring.

In addition, it is possible to provide a linear compressor capable of reducing friction loss with a stator generated by eccentricity of the mover by the lateral force.

In addition, it is possible to provide a linear compressor capable of improving the efficiency of magnetic interaction between the magnet and the piston while using a small amount of magnet.

In addition, it is possible to provide a linear compressor capable of improving the stability of the magnetic interaction between the magnet and the piston.

In addition, it is possible to provide a linear compressor capable of improving the stability of the axial reciprocating motion of an inner stator and a piston as a mover.

In addition, it is possible to provide a linear compressor capable of preventing an operator's error that occurs in the process of assembling the product.

In addition, it is possible to provide a linear compressor capable of reducing the cost incurred in the process of assembling the product.

In addition, it is possible to provide a linear compressor capable of improving the axial movement stroke of an inner stator and a piston as a mover while using a small amount of the magnet.

In addition, it is possible to provide a linear compressor capable of stably reciprocating the piston in the axial direction without any means such as a separate bearing for floating the piston inside the cylinder.

In addition, it is possible to provide a linear compressor capable of preventing interference of the cylinder to the electromagnetic interaction between the coil and the inner stator.

DETAILED DESCRIPTION OF THE EMBODIMENTS

Figure 1:
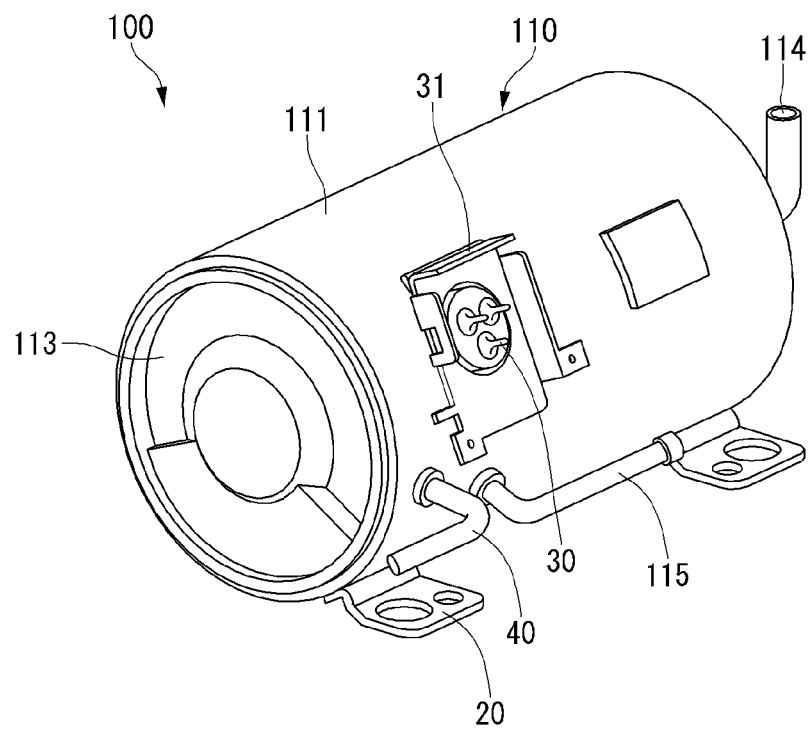
FIG. 1 is a perspective view of a compressor according to an embodiment of the present disclosure.

Hereinafter, embodiments disclosed in the present disclosure will be described in detail with reference to the accompanying drawings, however, regardless of the reference numerals, the same or similar components will be given the same reference numerals and redundant description thereof will be omitted.

In describing the embodiments disclosed in the present disclosure, when a component is referred to as being "connected" or "accessed" to other component, it may be directly connected or accessed to the other component, however, it may be understood that other components may be present in the middle.

In addition, in describing the embodiments disclosed in the present disclosure, when it is determined that the detailed description of the related known technology may obscure the subject matter of the embodiments disclosed in the present disclosure, the detailed description thereof will be omitted. In addition, the accompanying drawings are only for easily understanding the embodiments disclosed in the present disclosure, the technical spirit disclosed in the present disclosure is not limited by the accompanying drawings, and it should be understood that the accompanying drawings include all changes, equivalents, and substitutes included in the spirit and scope of the present disclosure.

On the other hand, terms of disclosure may be replaced with terms such as document, specification, description.

FIG. 1 is a perspective view of a compressor according to an embodiment of the present disclosure.

Referring to FIG. 1, a linear compressor 100 according to an embodiment of the present disclosure may include a shell 111 and shell covers 112 and 113 coupled to the shell 111. In a broad sense, the shell covers 112 and 113 may be understood as one configuration of the shell 111.

On the lower side of the shell 111, a leg 20 may be coupled. The leg 20 may be coupled to a base of a product on which the linear compressor 100 is installed. For example, the product may include a refrigerator, and the base may include a machine room base of the refrigerator. As another example, the product may include an outdoor unit of an air conditioner, and the base may include a base of the outdoor unit.

The shell 111 may have an approximately cylindrical shape, and may be arranged lying in a horizontal direction or in an axial direction. Based on FIG. 1, the shell 111 may be elongated in the horizontal direction, and may have a slightly lower height in the radial direction. That is, since the linear compressor 100 may have a low height, for example, when the linear compressor 100 is installed on the machine room base of the refrigerator, there is an advantage of reducing the height of the machine room.

In addition, the longitudinal central axis of the shell 111 coincides with the central axis of a main body of the compressor 100 to be described later, and the central axis of the main body of the compressor 100 coincides with the central axis of a cylinder 140 and a piston 150 constituting the main body of the compressor 100.

A terminal 30 may be installed on the outer surface of the shell 111. The terminal 30 may transmit external power to a driving unit 130 of the linear compressor 100. Specifically, the terminal 30 may be connected to a lead wire of a coil 132.

A bracket 31 may be installed on the outside of the terminal 30. The bracket 31 may include a plurality of brackets surrounding the terminal 30. The bracket 31 may perform a function of protecting the terminal 30 from external impacts.

Both sides of the shell 111 may be open. Shell covers 112 and 113 may be coupled to the both sides of the opened shell 111. Specifically, the shell covers 112 and 113 may include a first shell cover 112 coupled to one opened side of the shell 111, and a second shell cover 113 coupled to the opened other side of the shell 111. The inner space of the shell 111 may be sealed by the shell covers 112 and 113.

Based on FIG. 1, the first shell cover 112 may be located on the right side of the linear compressor 100, and the second shell cover 113 may be located on the left side of the linear compressor 100. In other words, the first and second shell covers 112 and 113 may be disposed to face each other. In addition, it can be understood that the first shell cover 112 is located on the suction side of the refrigerant, and the second shell cover 113 is located on the discharge side of the refrigerant.

The linear compressor 100 may be provided with the shell 111 or the shell covers 112 and 113, and may include a plurality of pipes 114, 115, and 40 capable of suction, discharging, or injecting the refrigerant The plurality of pipes 114, 115, and 40 may include a suction pipe 114 that allows the refrigerant to be sucked into the inside of the linear compressor 100, a discharge pipe 115 that allows the compressed refrigerant to be discharged from the linear compressor 100, and a supplement pipe 40 for replenishing the refrigerant to the linear compressor 100.

For example, the suction pipe 114 may be coupled to the first shell cover 112. The refrigerant may be sucked into the linear compressor 100 along the axial direction through the suction pipe 114.

The discharge pipe 115 may be coupled to an outer circumferential surface of the shell 111. The refrigerant sucked through the suction pipe 114 may be compressed while flowing in the axial direction. In addition, the compressed refrigerant may be discharged through the discharge pipe 115. The discharge pipe 115 may be disposed closer to the second shell cover 113 than the first shell cover 112.

The supplement pipe 40 may be coupled to the outer circumferential surface of the shell 111. An operator may inject the refrigerant into the linear compressor 100 through the supplement pipe 40.

The supplement pipe 40 may be coupled to the shell 111 at a different height from the discharge pipe 115 in order to avoid interference with the discharge pipe 115. Here, the height may be understood as a distance in the vertical direction from the leg 20. As the discharge pipe 115 and the supplement pipe 40 are coupled to the outer circumferential surface of the shell 111 at different heights, operation convenience may be promoted.

At least a part of the second shell cover 113 may be located adjacent to an inner circumferential surface of the shell 111 corresponding to a point at which the supplement pipe 40 is coupled. In other words, at least the part of the second shell cover 113 may act as a resistance of the refrigerant injected through the supplement pipe 40.

Therefore, in terms of the flow path of the refrigerant, the size of the flow path of the refrigerant flowing through the supplement pipe 40 is formed to be reduced by the second shell cover 113 while entering the inner space of the shell 111, and to be increased again while passing through it. In this process, the pressure of the refrigerant is reduced so that the refrigerant may be vaporized, and in this process, the oil contained in the refrigerant may be separated. Accordingly, as the refrigerant from which oil is separated flows into the piston 150, the compression performance of the refrigerant may be improved. The oil may be understood as operation oil present in a cooling system.

Figure 2:
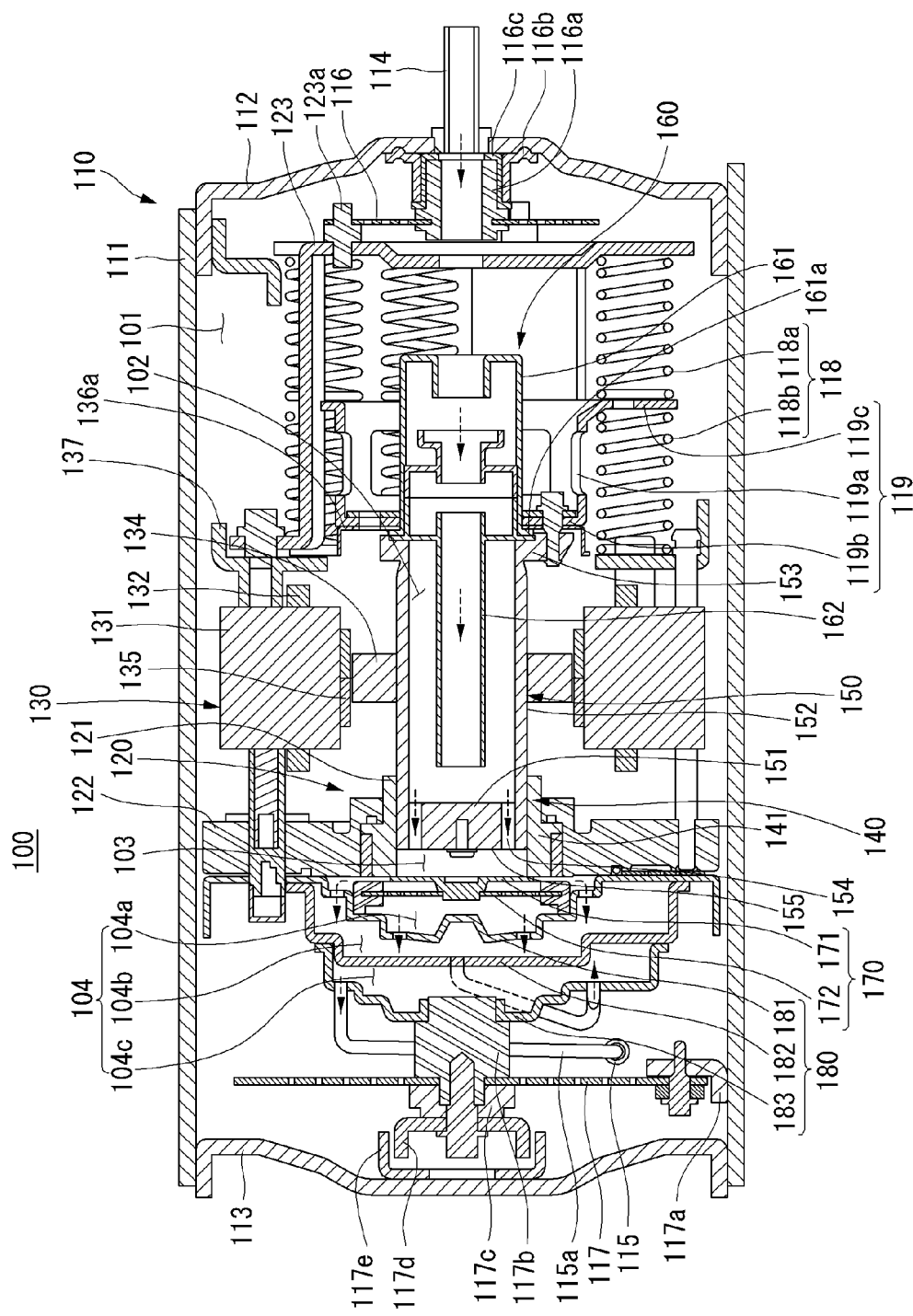
FIG. 2 is a cross-sectional view of a linear compressor according to an embodiment of the present disclosure.

FIG. 2 is a cross-sectional view for describing a structure of a linear compressor 100.

Hereinafter, the compressor 100 according to the present disclosure will be described with an example of the linear compressor 100 that sucks and compresses a fluid while a piston performs a linear reciprocating motion, and performs an operation of discharging the compressed fluid.

The linear compressor 100 may be a component of a refrigerating cycle, and the fluid compressed by the linear compressor 100 may be a refrigerant circulating in the refrigerating cycle. In addition to the compressor, the refrigerating cycle may include a condenser, an expansion device, and an evaporator. In addition, the linear compressor 100 may be used as a component of a cooling system of a refrigerator, but is not limited thereto and may be widely used throughout the industry.

Referring to FIG. 2, the compressor 100 may include a casing 110 and a main body accommodated in the casing 110. The main body of the compressor 100 may include a frame 120, the cylinder 140 fixed to the frame 120, a piston 150 for linearly reciprocating the inside of the cylinder 140, the driving unit 130 that is fixed to the frame 120 and provides a driving force to the piston 150, and the like. Here, the cylinder 140 and the piston 150 may be referred to as compression units 140 and 150.

The compressor 100 may include a bearing means for reducing the friction between the cylinder 140 and the piston 150. The bearing means may be oil bearings or gas bearings. Alternatively, a mechanical bearing may be used as the bearing means.

The main body of the compressor 100 may be elastically supported by support springs 116 and 117 installed at both inner ends of the casing 110. The support springs 116 and 117 may include a first support spring 116 supporting the rear of the main body and a second support spring 117 supporting the front of the main body. The support springs 116 and 117 may include leaf springs. The support springs 116 and 117 may absorb vibrations and shocks generated by the reciprocating motion of the piston 150 while supporting internal parts of the main body of the compressor 100.

The casing 110 may form a closed space. The closed space may include an accommodation space 101 in which the sucked refrigerant is accommodated, a suction space 102 filled with the refrigerant before being compressed, a compression space 103 that compresses the refrigerant, and a discharge space 104 filled with the compressed refrigerant.

The refrigerant sucked from the suction pipe 114 connected to the rear side of the casing 110 may be filled in the accommodation space 101, the refrigerant in the suction space 102 communicating with the accommodation space 101 may be compressed in the compression space 103 and discharged to the discharge space 104, and may be discharged to the outside through the discharge pipe 115 connected to the front side of the casing 110.

The casing 110 may include the shell 111 formed in a long cylindrical shape in an approximately transverse direction by opening both ends, the first shell cover 112 coupled to the rear side of the shell 111 and the second shell cover 113 coupled to the front side of the shell 111. Here, the front side may be interpreted to mean a direction in which the compressed refrigerant is discharged to the left of the drawing, and the rear side may be interpreted to mean a direction in which the refrigerant flows to the right side of the drawing. In addition, the first shell cover 112 or the second shell cover 113 may be integrally formed with the shell 111.

The casing 110 may be formed of a thermally conductive material. Through this, heat generated in the inner space of the casing 110 can be quickly radiated to the outside.

The first shell cover 112 may be coupled to the shell 111 to seal the rear side of the shell 111, and the suction pipe 114 may be inserted and coupled to the center of the first shell cover 112.

The rear side of the main body of the compressor 100 may be elastically supported in the radial direction of the first shell cover 112 by the first support spring 116.

The first support spring 116 may include a circular leaf spring. An edge portion of the first support spring 116 may be elastically supported in a forward direction with respect to a back cover 123 by a support bracket 123a. An opened central portion of the first support spring 116 may be supported in a rearward direction with respect to the first shell cover 112 by a suction guide 116a.

The suction guide 116a may have a through flow path formed therein. The suction guide 116a may be formed in a cylindrical shape. The suction guide 116a may have a central opening of the first support spring 116 coupled to the front outer circumferential surface, and the rear end may be supported by the first shell cover 112. In this case, a separate suction side support member 116b may be interposed between the suction guide 116a and the inner surface of the first shell cover 112.

The rear side of the suction guide 116a may communicate with the suction pipe 114, and the refrigerant sucked through the suction pipe 114 may pass through the suction guide 116a and smoothly flow into a muffler unit 160 to be described later.

A damping member 116c may be disposed between the suction guide 116a and the suction side support member 116b. The damping member 116c may be formed of a rubber material or the like. Accordingly, it is possible to block vibration that may occur while the refrigerant is sucked through the suction pipe 114 from being transmitted to the first shell cover 112.

The second shell cover 113 may be coupled to the shell 111 to seal the front side of the shell 111, and may be coupled by inserting the discharge pipe 115 through a loop pipe 115a. The refrigerant discharged from the compression space 103 may pass through a discharge cover assembly 180 and then be discharged to the refrigerating cycle through the loop pipe 115a and the discharge pipe 115.

The front side of the main body of the compressor 100 may be elastically supported in the radial direction of the shell 111 or the second shell cover 113 by the second support spring 117.

The second support spring 117 may include a circular leaf spring. An opened central portion of the second support spring 117 may be supported in a rearward direction with respect to the discharge cover assembly 180 by a first support guide 117b. An edge portion of the second support spring 117 may be supported in a forward direction with respect to the inner surface of the shell 111 or the inner circumferential surface of the shell 111 adjacent to the second shell cover 113 by a support bracket 117a.

Unlike FIG. 2, the edge portion of the second support spring 117 may be supported in a forward direction with respect to the inner surface of the shell 111 or the inner circumferential surface of the shell 111 adjacent to the second shell cover 113 through a separate bracket (not shown) coupled to the second shell cover 113.

The first support guide 117b may be formed in a cylindrical shape. A cross section of the first support guide 117b may include a plurality of diameters. A front side of the first support guide 117b may be inserted into a central opening of the second support spring 117, and a rear side may be inserted into a central opening of the discharge cover assembly 180. A support cover 117c may be coupled to the front side of the first support guide 117b with the second support spring 117 interposed therebetween. A cup-shaped second support guide 117d that is concave forward may be coupled to the front side of the support cover 117c. A cup-shaped third support guide 117e that corresponds to the second support guide 117d and is concave to rearward may be coupled to an inside of the second shell cover 113. The second support guide 117d may be supported in an axial direction and/or a radial direction by being inserted into an inside of the third support guide 117e. In this case, a gap may be formed between the second support guide 117d and the third support guide 117e.

The frame 120 may include a body portion 121 supporting the outer circumferential surface of the cylinder 140 and a first flange portion 122 connected to one side of the body portion 121 and supporting the driving unit 130. The frame 120 may be elastically supported with respect to the casing 110 by first and second support springs 116 and 117 together with the driving unit 130 and the cylinder 140.

The body portion 121 may surround the outer circumferential surface of the cylinder 140. The body portion 121 may be formed in a cylindrical shape. The first flange portion 122 may be formed to extend in a radial direction from the front end of the body portion 121.

The cylinder 140 may be coupled to the inner circumferential surface of the body portion 121. For example, the cylinder 140 may be fixed by press fitting to the inner circumferential surface of the body portion 121.

An outer stator 131 may be coupled to a rear surface of the first flange portion 122, and the discharge cover assembly 180 may be coupled to a front surface of the first flange portion 122. For example, the outer stator 131 and the discharge cover assembly 180 may be fixed through a mechanical coupling means.

The frame 120 and the cylinder 140 may be formed of aluminum or aluminum alloy material.

The cylinder 140 may be formed in a cylindrical shape in which both ends are open. The piston 150 may be inserted through a rear end of the cylinder 140. A front end of the cylinder 140 may be closed through a discharge valve assembly 170. The compression space 103 may be formed among the cylinder 140, a front end of the piston 150, and the discharge valve assembly 170. Here, the front end of the piston 150 may be referred to as a head portion 151. The volume of the compression space 103 increases when the piston 150 moves backward, and decreases as the piston 150 forward. That is, the refrigerant flowing into the compression space 103 may be compressed while the piston 150 advances, and may be discharged through the discharge valve assembly 170.

The cylinder 140 may include a second flange portion 141 disposed at the front end. The second flange portion 141 may be bent to the outside of the cylinder 140. The second flange portion 141 may extend in the outer circumferential direction of the cylinder 140. The second flange portion 141 of the cylinder 140 may be coupled to the frame 120. For example, a flange groove corresponding to the second flange portion 141 of the cylinder 140 may be formed at the front end of the frame 120, and the second flange portion 141 of the cylinder 140 may be inserted into the flange groove and coupled through a coupling member.

On the other hand, a gas bearing means capable of lubricating gas between the cylinder 140 and the piston 150 may be provided by supplying discharge gas at a distance between an outer circumferential surface of the piston 150 and the outer circumferential surface of the cylinder 140. The discharge gas between the cylinder 140 and the piston 150 may provide a levitation force to the piston 150 to reduce friction generated between the piston 150 and the cylinder 140.

The cylinder 140 may not overlap with an inner stator 134 and the outer stator 131 in the radial direction. Through this, it is possible to prevent the cylinder 140 from interfering with the electromagnetic interaction between the coil 132 and the inner stator 134.

The piston 150 is inserted into the open end of the rear of the cylinder 140, and is provided to seal the rear of the compression space 103.

The piston 150 may include a head portion 151 and a guide portion 152. The head portion 151 may be formed in a disk shape. The head portion 151 may be partially open. The head portion 151 may partition the compression space 103. The guide portion 152 may extend rearward from an outer circumferential surface of the head portion 151. The guide portion 152 may be formed in a cylindrical shape. The guide portion 152 may have a hollow inside, and the front portion may be partially sealed by the head portion 151. A rear of the guide portion part 152 may be opened to be connected to the muffler unit 160. The head portion 151 may be provided as a separate member coupled to the guide portion 152. Alternatively, the head portion 151 and the guide portion 152 may be integrally formed.

The piston 150 may be connected to the inner stator 134. The inner stator 134 may be disposed on the outer circumferential surface of the piston 150. The inner stator 134 may be disposed on an outer circumferential surface of the guide portion 152 of the piston 150. The inner stator 134 may be fixed and coupled to the outer circumferential surface of the guide portion 152 of the piston 150. The outer circumferential surface of the piston 150 may be coupled to an inner circumferential surface of the inner stator 134. For example, the guide portion 152 of the piston 150 may be press-fitted to the inner circumferential surface of the inner stator 134. The piston 150 may reciprocate in the front-rear direction or the axial direction according to the movement of the inner stator 134.

The piston 150 may include a suction port 154. The suction port 154 may pass through the head portion 151. The suction port 154 may communicate with the suction space 102 and the compression space 103 inside the piston 150. For example, the refrigerant flowing from the accommodation space 101 to the suction space 102 inside the piston 150 may pass through the suction port 154 and be sucked into the compression space 103 between the piston 150 and the cylinder 140.

The suction port 154 may extend in an axial direction of the piston 150. The suction port 154 may be formed to be inclined in the axial direction of the piston 150. For example, the suction port 154 may extend to be inclined toward the rear of the piston 150 in a direction away from the central axis.

The suction port 154 may be formed in a circular cross-section. The suction port 154 may have a uniform inner diameter. Alternatively, the suction port 154 may be formed as a long hole whose opening extends in the radial direction of the head portion 151, or may be formed such that the inner diameter increases toward the rear.

A plurality of suction ports 154 may be formed in any one or more of a radial direction and a circumferential direction of the head portion 151.

A suction valve 155 for selectively opening and closing the suction port 154 may be mounted on the head portion 151 of the piston 150 adjacent to the compression space 103. The suction valve 155 may be operated by elastic deformation to open or close the suction port 154. That is, the suction valve 155 may be elastically deformed to open the suction port 154 by the pressure of the refrigerant flowing to the compression space 103 through the suction port 154.

The muffler unit 160 may be coupled to the rear of the piston 150 to attenuate noise generated during a process in which the refrigerant is sucked into the piston 150. The refrigerant sucked through the suction pipe 114 may flow into the suction space 102 inside the piston 150 through the muffler unit 160.

The muffler unit 160 may include a suction muffler 161 communicated with the accommodation space 101 of the casing 110 and an inner guide 162 connected to the front of the suction muffler 161 and guiding the refrigerant to the suction port 154.

The suction muffler 161 may be located at the rear of the piston 150, the rear opening may be disposed adjacent to the suction pipe 114, and the front end may be coupled to the rear of the piston 150. The suction muffler 161 may have a flow path formed in the axial direction to guide the refrigerant in the accommodation space 101 to the suction space 102 inside the piston 150.

A plurality of noise spaces partitioned by baffles may be formed inside the suction muffler 161. The suction muffler 161 may be formed by combining two or more members with each other, for example, the second suction muffler may be press-fitted into the first suction muffler to form a plurality of noise spaces. In addition, the suction muffler 161 may be formed of a plastic material in consideration of weight or insulation.

One side of the inner guide 162 may communicate with the noise space of the suction muffler 161, and the other side of the inner guide 162 may be deeply inserted into the inside of the piston 150. The inner guide 162 may be formed in a pipe shape. Both ends of the inner guide 162 may have the same inner diameter. The inner guide 162 may be formed in a cylindrical shape. Alternatively, the inner diameter of the front end, which is the discharge side, may be formed larger than the inner diameter of the rear end, which is the opposite side.

The suction muffler 161 and the inner guide 162 may be provided in various shapes, through these, the pressure of the refrigerant passing through the muffler unit 160 can be adjusted. The suction muffler 161 and the inner guide 162 may be integrally formed.

The discharge valve assembly 170 may include a discharge valve 171 and a valve spring 172 provided on the front side of the discharge valve 171 to elastically support the discharge valve 171. The discharge valve assembly 170 may selectively discharge the refrigerant compressed in the compression space 103. Here, the compression space 103 means a space formed between the suction valve 155 and the discharge valve 171.

The discharge valve 171 may be disposed to be supported on the front surface of the cylinder 140. The discharge valve 171 may selectively open and close a front opening of the cylinder 140. The discharge valve 171 may be operated by elastic deformation to open or close the compression space 103. The discharge valve 171 may be elastically deformed to open the compression space 103 by the pressure of the refrigerant flowing into the discharge space 104 through the compression space 103. For example, while the discharge valve 171 is supported on the front surface of the cylinder 140, the compression space 103 is kept closed, and the compressed refrigerant in the compressed space 103 may be discharged into an open space while the discharge valve 171 is spaced apart from the front surface of the cylinder 140.

The valve spring 172 may be provided between the discharge valve 171 and the discharge cover assembly 180 to provide an elastic force in the axial direction. The valve spring 172 may be provided as a compression coil spring, or may be provided as a leaf spring in consideration of an occupied space or reliability aspect.

When the pressure in the compression space 103 is greater than or equal to the discharge pressure, the valve spring 172 may be deformed forward and open the discharge valve 171, and the refrigerant may be discharged from the compression space 103 and discharged to a first discharge space 104a of the discharge cover assembly 180. When the discharge of the refrigerant is completed, the valve spring 172 may provide a restoring force to the discharge valve 171 so that the discharge valve 171 may be closed.

A process in which the refrigerant flows into the compression space 103 through the suction valve 155 and the refrigerant in the compression space 103 is discharged to the discharge space 104 through the discharge valve 171 will be described as follows.

In the process of the piston 150 reciprocating and linear movement inside the cylinder 140, when the pressure in the compression space 103 becomes less than or equal to a predetermined suction pressure, the suction valve 155 is opened, and the refrigerant is sucked into the compression space 103. On the other hand, when the pressure in the compression space 103 exceeds a predetermined suction pressure, the refrigerant in the compression space 103 is compressed while the suction valve 155 is closed.

On the other hand, when the pressure in the compression space 103 is greater than or equal to a predetermined discharge pressure, the valve spring 172 deforms forward and opens the discharge valve 171 connected thereto, and the refrigerant is discharged from the compression space 103 to the discharge space 104 of the discharge cover assembly 180. When discharge of the refrigerant is completed, the valve spring 172 provides a restoring force to the discharge valve 171, and the discharge valve 171 is closed to seal the front of the compression space 103.

The discharge cover assembly 180 may be installed in front of the compression space 103 to form the discharge space 104 that accommodates the refrigerant discharged from the compression space 103, and may be coupled to the front of the frame 120 to attenuate noise generated in the process of discharging the refrigerant from the compressed space 103. The discharge cover assembly 180 may be coupled to the front of the first flange portion 122 of the frame 120 while receiving the discharge valve assembly 170. For example, the discharge cover assembly 180 may be coupled to the first flange portion 122 through a mechanical coupling member.

In addition, a gasket for heat insulation and an o-ring for suppressing the leakage of the refrigerant in the discharge space 104 may be provided between the discharge cover assembly 180 and the frame 120.

The discharge cover assembly 180 may be formed of a thermally conductive material. Accordingly, when a high-temperature refrigerant flows into the discharge cover assembly 180, heat of the refrigerant may be transferred to the casing 110 through the discharge cover assembly 180 to be radiated to the outside of the compressor.

The discharge cover assembly 180 may be formed of one discharge cover, or may be disposed so that a plurality of discharge covers are sequentially communicated. When the discharge cover assembly 180 is provided with a plurality of discharge covers, the discharge space 104 may include a plurality of spaces partitioned by each discharge cover. The plurality of space portions are disposed in a front-rear direction and may communicate with each other.

For example, when there are three discharge covers, the discharge space 104 may include a first discharge space 104a formed between a first discharge cover 181 coupled to the front side of the frame 120 and the frame 120, a second discharge space 104b formed between a second discharge cover 182 communicated with the first discharge space 104a and coupled to the front side of the first discharge cover 181 and the first discharge cover 181, and a third discharge space 104c formed between a third discharge cover 183 communicated with the second discharge space 104b and coupled to the front side of the second discharge cover 182 and the second discharge cover 182.

In addition, the first discharge space 104a may be selectively communicated with the compression space 103 by the discharge valve 171, the second discharge space 104b may be communicated with the first discharge space 104a, and the third discharge space 104c may be communicated with the second discharge space 104b. Accordingly, the refrigerant discharged from the compression space 103 may attenuate discharge noise while passing through the first discharge space 104a, the second discharge space 104b, and the third discharge space 104c in sequence, and may be discharged to the outside of the casing 110 through the loop pipe 115a and the discharge pipe 115 communicated with the third discharge cover 183.

The driving unit 130 may include the outer stator 131 coupled to the frame 120 between the shell 111 and the frame 120, the coil 132 disposed on the outer stator 131, and the inner stator 134 coupled to the piston 150.

When a current is applied to the driving unit 130, a magnetic flux is formed in the coil 132, and an electromagnetic force is generated by the interaction between the magnetic flux formed in the winding coil of the outer stator 131 and the inner stator 134, which is a magnetic substance, so that the inner stator 134 may move. In addition, the piston 150 connected to the inner stator 134 may also reciprocate in the axial direction integrally with the inner stator 134 at the same time as the inner stator 134 reciprocates in the axial direction.

Meanwhile, the driving unit 130 and the compression units 140 and 150 may be supported in the axial direction by the support springs 116 and 117 and a resonance spring 118.

The resonance spring 118 may achieve effective compression of the refrigerant by amplifying the vibration implemented by the reciprocating motion of the inner stator 134 and the piston 150. Specifically, the resonance spring 118 may be adjusted to a frequency corresponding to the natural frequency of the piston 150 so that the piston 150 may perform resonant motion. In addition, the resonance spring 118 may cause a stable movement of the piston 150 to reduce vibration and noise generation.

The resonance spring 118 may be a coil spring extending in the axial direction. Both ends of the resonance spring 118 may be connected to a vibrating body and a fixture, respectively. For example, one end of the resonance spring 118 may be connected to the piston 150 and the other end may be connected to the back cover 123. Accordingly, the resonance spring 118 may be elastically deformed between the vibrating body vibrating at the one end and the fixture fixed to the other end.

The natural frequency of the resonance spring 118 is designed to match the resonance frequency of the inner stator 134 and the piston 150 when the compressor 100 is operated, so that the reciprocating motion of the piston 150 may be amplified. However, since the back cover 123 provided as a fixture is elastically supported to the casing 110 through the first support spring 116, it may not be strictly fixed.

The resonance spring 118 may include a first resonance spring 118a supported on the rear side and a second resonance spring 118b supported on the front side based on a spring supporter 119.

The spring supporter 119 may include a body portion 119a surrounding the suction muffler 161, a second coupling portion 119b bent in an inner radial direction from the front of the body portion 119a, and a support portion 119c bent in an outer radial direction from the rear of the body portion 119a.

The second coupling portion 119b of the spring supporter 119 may be supported by the piston 150. The inner diameter of the second coupling portion 119b of the spring supporter 119 may surround the outer diameter of the suction muffler 161. For example, the second coupling portion 119b of the spring supporter 119 and a third flange portion 153 of the piston 150 may be sequentially disposed and then integrally coupled through a mechanical member. In this case, a fourth flange portion 161a of the suction muffler 161 may be interposed and fixed together.

The first resonance spring 118a may be disposed between a front surface of the back cover 123 and a rear surface of the spring supporter 119. The second resonance spring 118b may be disposed between a rear surface of a stator cover 137 and a front surface of the spring supporter 119.

A plurality of first and second resonance springs 118a and 118b may be disposed in the circumferential direction of the central axis. The first resonance spring 118a and the second resonance spring 118b may be disposed parallel to each other in the axial direction, or may be disposed alternately with each other. The first and second resonance springs 118a and 118b may be disposed at regular intervals in the radial direction of the central axis. For example, three first and second resonance springs 118a and 118b may be provided, respectively, and may be disposed at intervals of 120 degrees in the radial direction of the central axis.

The compressor 100 may include a plurality of sealing members capable of increasing a coupling force between the frame 120 and parts around the frame 120.

For example, the plurality of sealing members may include a first sealing member interposed in a portion where the frame 120 and the discharge cover assembly 180 are coupled and inserted into an installation groove provided at the front end of the frame 120 and a second sealing member provided at a portion where the frame 120 and the cylinder 140 are coupled and inserted into an installation groove provided on the outer surface of the cylinder 140. The second sealing member may increase the coupling force between the frame 120 and the cylinder 140.

The operation of the linear compressor 100 described above is as follows.

First, when a current is applied to the driving unit 130, a magnetic flux may be formed in the outer stator 131 by the current flowing through the coil 132. The magnetic flux formed in the outer stator 131 may generate an electromagnetic force, and the inner stator 134, which is a magnetic material, may linearly reciprocate by the generated electromagnetic force. The electromagnetic force may be generated in a direction (forward direction) of the piston 150 toward a top dead center (TDC) during a compression stroke, and may be generated alternately in a direction (rear direction) of the piston 150 toward a bottom dead center (BDC) during a suction stroke. That is, the driving unit 130 may generate thrust, which is a force that pushes the inner stator 134 and the piston 150 in the moving direction.

The piston 150, which linearly reciprocates inside the cylinder 140, may repeatedly increase or decrease the volume of the compression space 103.

When the piston 150 moves in a direction (rear direction) to increase the volume of the compression space 103, the pressure in the compression space 103 may decrease. Accordingly, the suction valve 155 mounted in front of the piston 150 is opened, and the refrigerant remaining in the suction space 102 may be sucked into the compression space 103 along the suction port 154. This suction stroke may proceed until the piston 150 is located at the bottom dead center by increasing the volume of the compression space 103 to the maximum.

The piston 150 having reached the bottom dead center may perform the compression stroke while moving in a direction (forward direction) in which the movement direction is changed and the volume of the compression space 103 is decreased. During the compression stroke, as the pressure in the compression space 103 increases, the sucked refrigerant may be compressed. When the pressure of the compression space 103 reaches the set pressure, the discharge valve 171 is pushed by the pressure of the compression space 103 and is opened from the cylinder 140, and the refrigerant may be discharged to the discharge space 104 through the spaced space. This compression stroke may be continued while the piston 150 moves to the top dead center where the volume of the compression space 103 is a minimum.

As the suction stroke and compression stroke of the piston 150 are repeated, the refrigerant flowing into the accommodation space 101 inside the compressor 100 through the suction pipe 114 may flow into the suction space 102 inside the piston 150 through the suction guide 116a, the suction muffler 161 and the inner guide 162 in sequence, and the refrigerant in the suction space 102 may flow into the compression space 103 inside the cylinder 140 during the suction stroke of the piston 150. After the refrigerant in the compression space 103 is compressed and discharged to the discharge space 104 during the compression stroke of the piston 150, a flow discharged to the outside of the compressor 100 may be formed through the loop pipe 115a and the discharge pipe 115.

Figure 3:
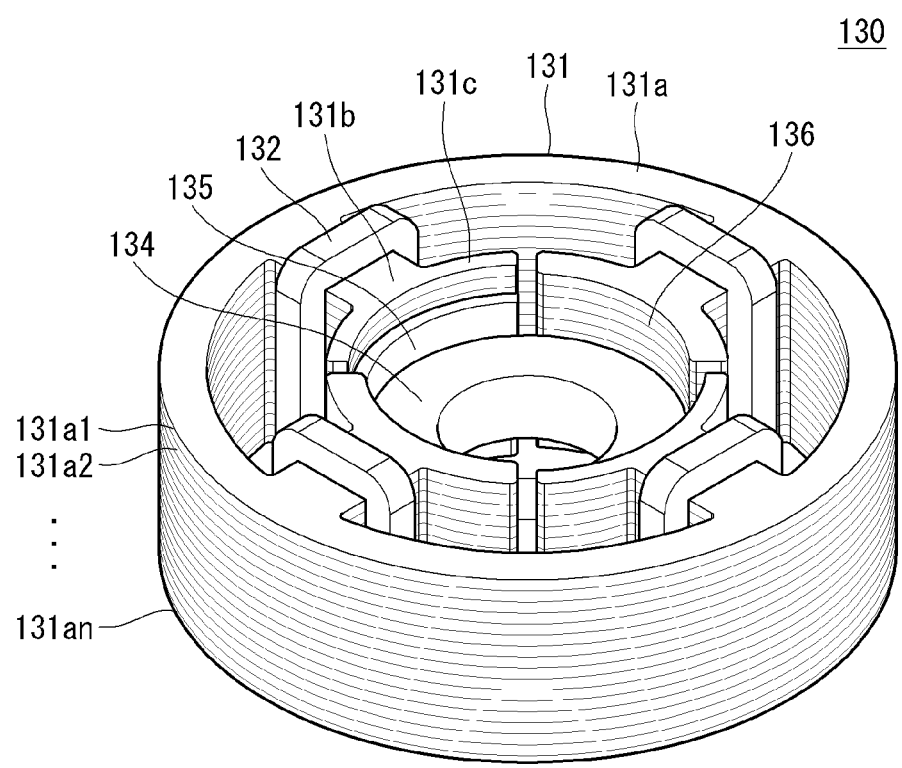
FIG. 3 is a perspective view of a driving unit according to an embodiment of the present disclosure.
Figure 4:
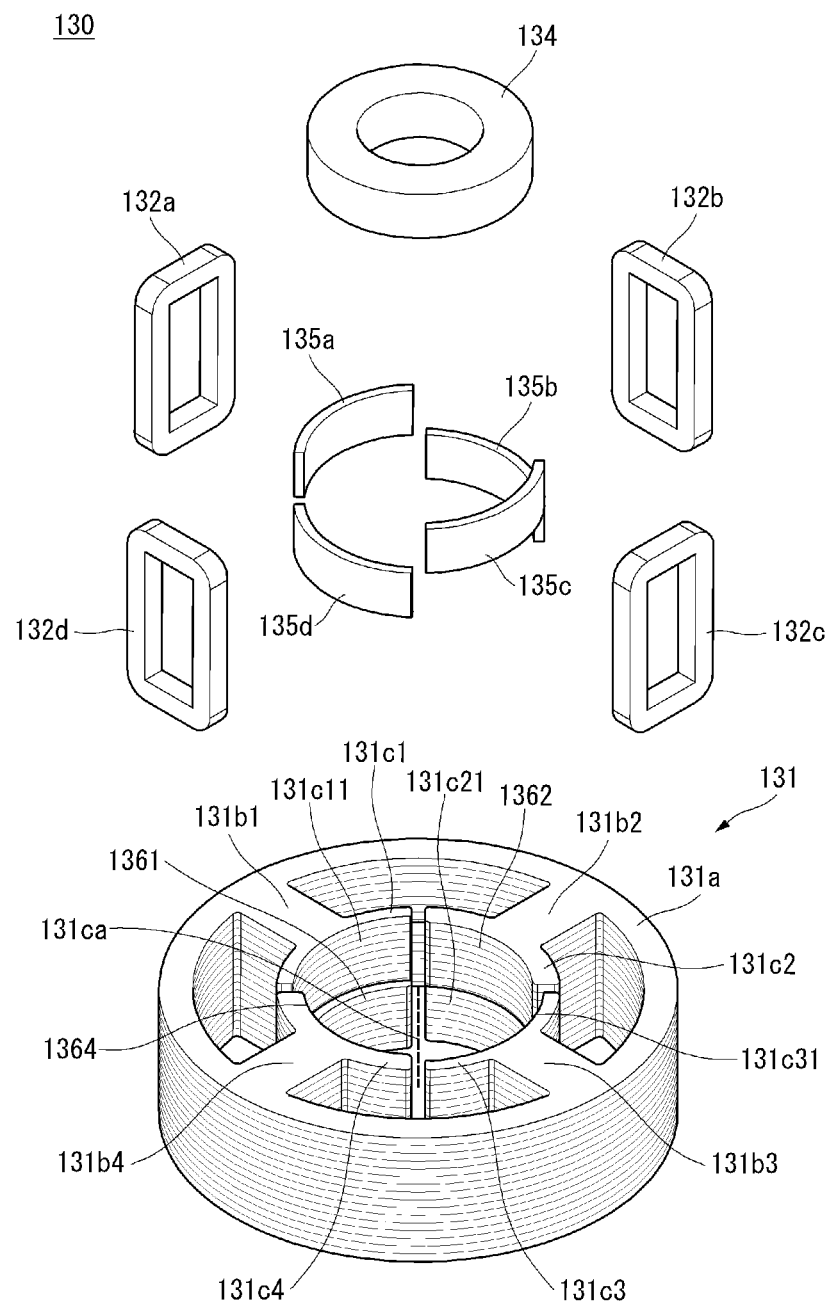
FIG. 4 is an exploded perspective view of a driving unit according to an embodiment of the present disclosure.
Figure 5:
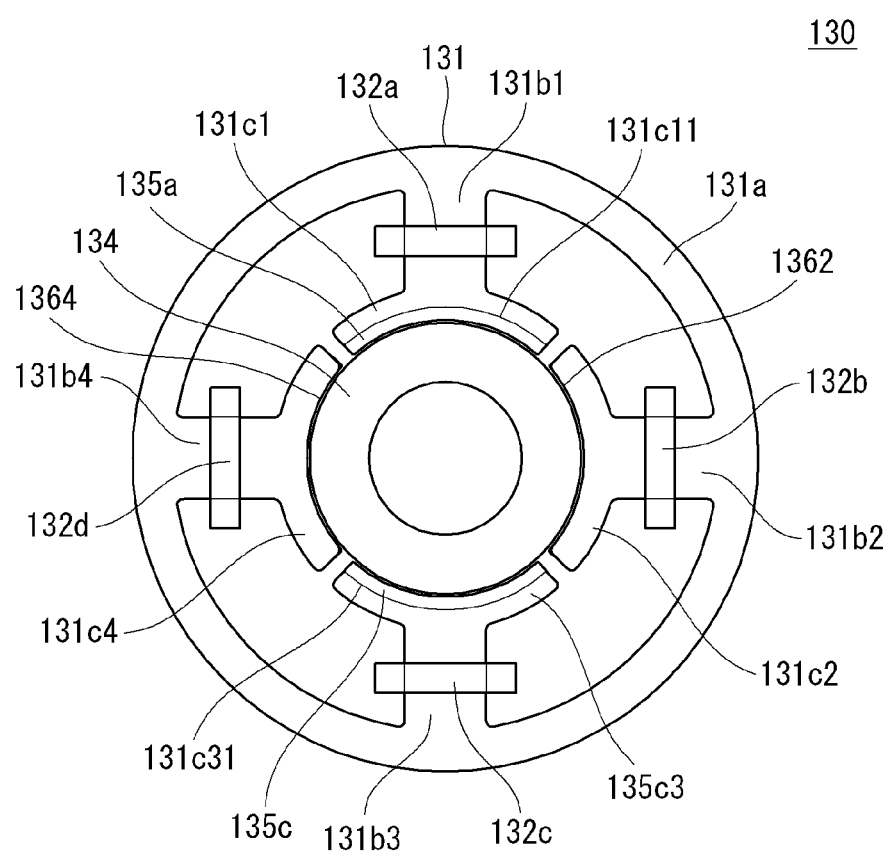
FIG. 5 is a plane view of a driving unit according to an embodiment of the present disclosure.
Figure 6:
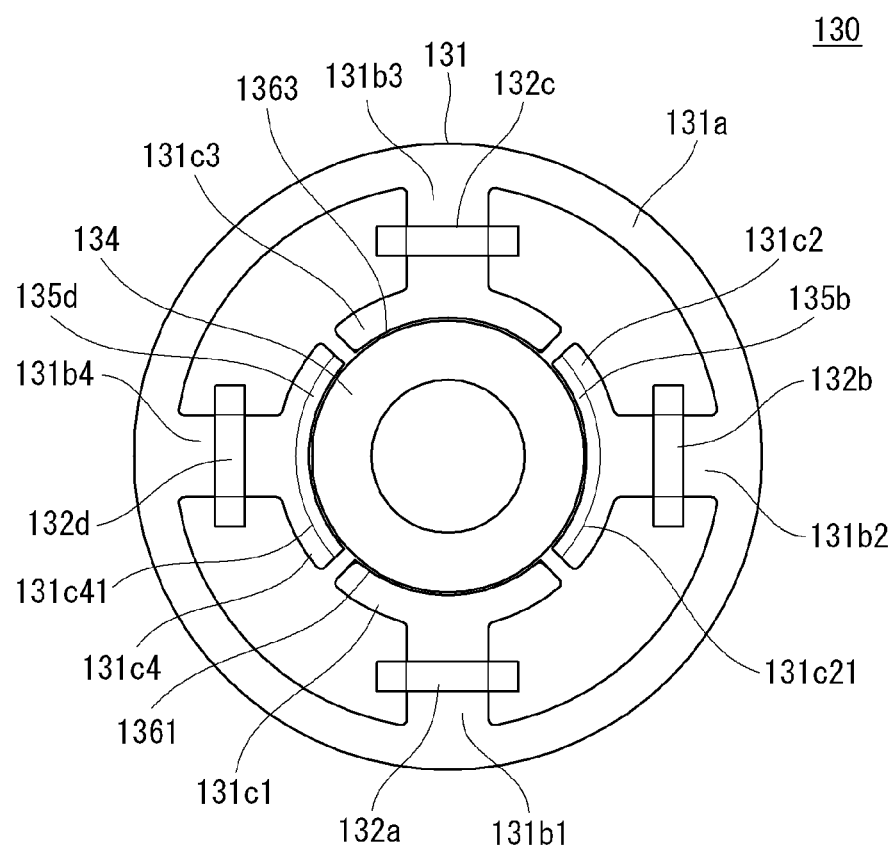
FIG. 6 is a bottom view of a driving unit according to an embodiment of the present disclosure.
Figure 7:
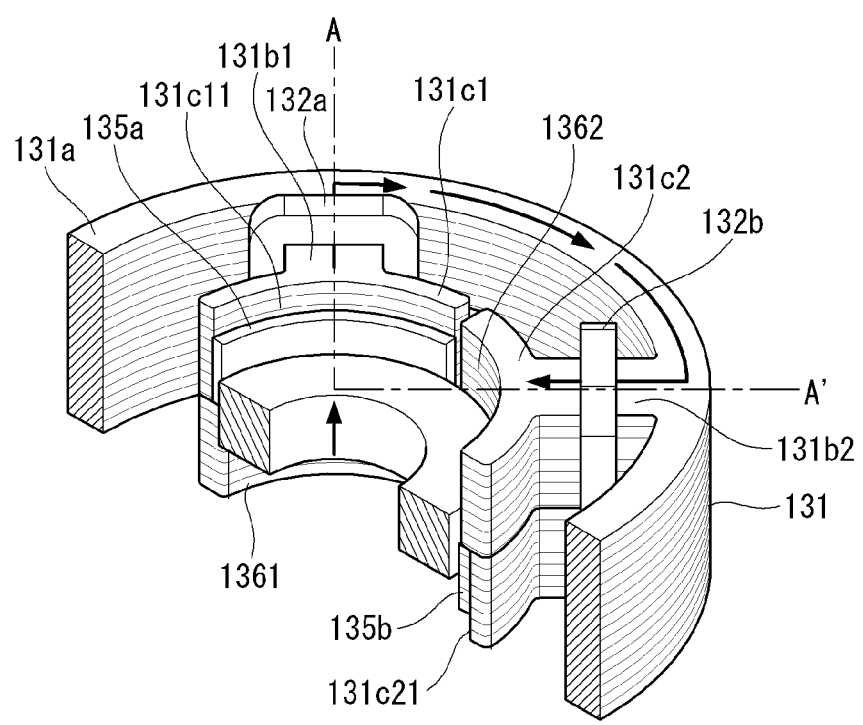
FIG. 7 is a view showing a state in which a part of a driving unit according to an embodiment of the present disclosure is removed.
Figure 12:
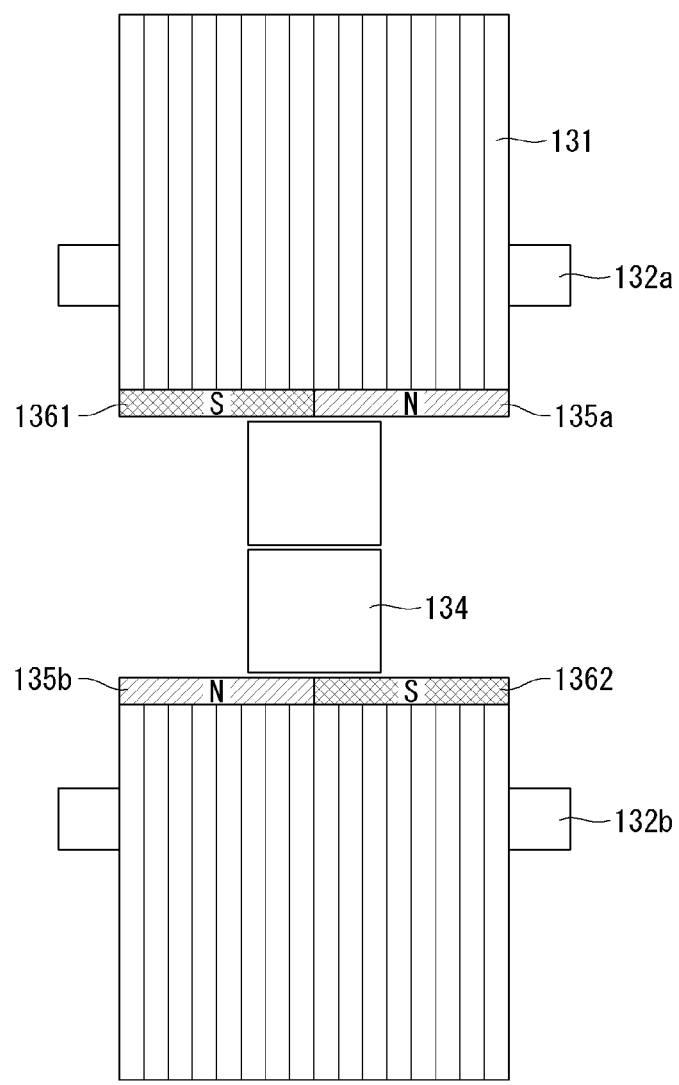
FIGS. 12 to 14 are views schematically showing a cross-sectional view taken along line A-A' of FIG. 7.
Figure 13:
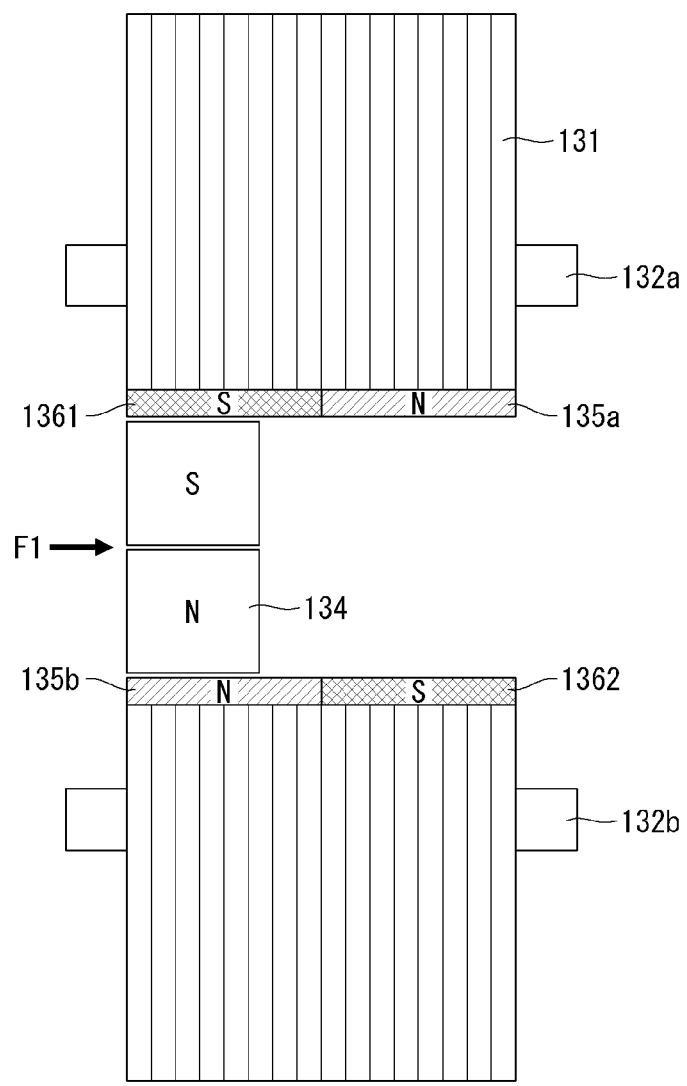
Figure 14:
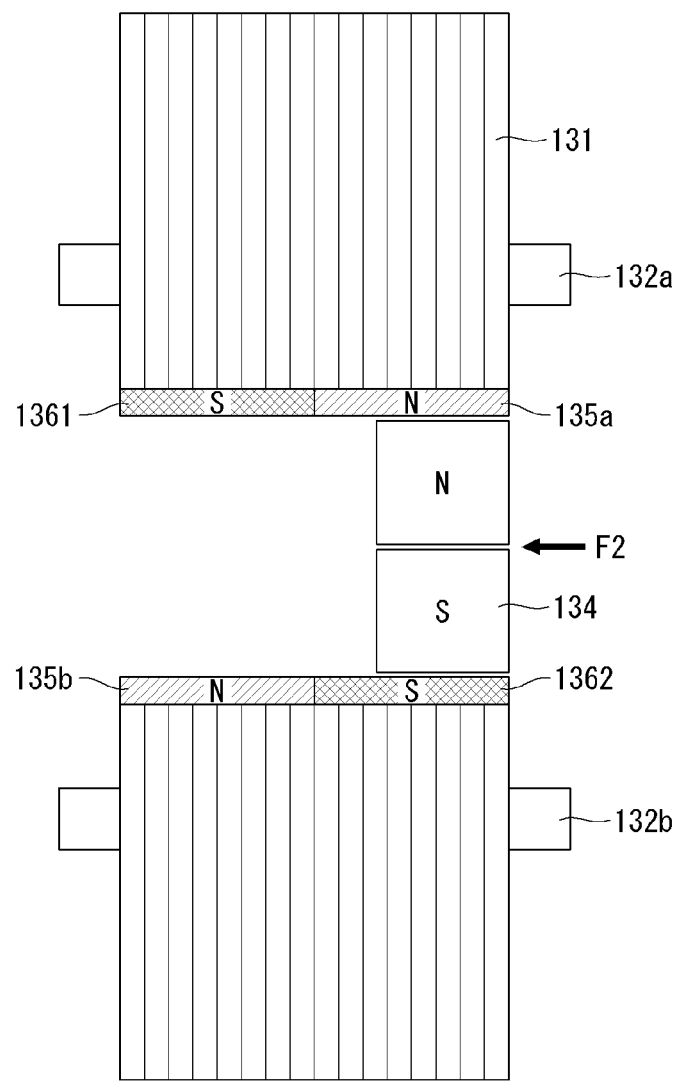

FIG. 3 is a perspective view of a driving unit according to an embodiment of the present disclosure. FIG. 4 is an exploded perspective view of a driving unit according to an embodiment of the present disclosure. FIG. 5 is a plane view of a driving unit according to an embodiment of the present disclosure. FIG. 6 is a bottom view of a driving unit according to an embodiment of the present disclosure. FIG. 7 is a view showing a state in which a part of a driving unit according to an embodiment of the present disclosure is removed. FIGS. 8 to 11 are schematic diagrams of a driving unit according to various embodiments of the present disclosure. FIGS. 12 to 14 are views schematically showing a cross-sectional view taken along line A-A' of FIG. 7.

Referring to FIGS. 1 to 14, the linear compressor 100 according to an embodiment of the present disclosure may include a frame 120, a driving unit 130, a cylinder 140, and a piston 150, but it does not exclude additional components. The detailed configuration of the linear compressor 100, which is not described below, and the detailed configuration of the frame 120, the driving unit 130, the cylinder 140, and the piston 150 may be understood to be the same as the detailed configuration of the linear compressor 100 described in FIG. 2, the detailed configuration of the frame 120, the driving unit 130, the cylinder 140, and the piston 150.

The driving unit 130 may be a transverse magnetic flux type reciprocating motor in which a direction of a magnetic flux and a direction of a linear movement of the piston 150 form a right angle. In the embodiment of the present disclosure, the driving unit 130 may be referred to as a "transverse magnetic flux type reciprocating motor."

The driving unit 130 may include an outer stator 131, a coil 132, an inner stator 134, a magnet 135, and a virtual pole 136.

The outer stator 131 may be coupled to the frame 120. The outer stator 131 may be coupled to the frame 120 through mechanical means. The outer stator 131 may be connected to the frame 120. The outer stator 131 may be supported by the frame 120. The outer stator 131 may be coupled to the rear of the first flange portion 122 of the frame 120. The front side of the outer stator 131 may be supported by the first flange portion 122 of the frame 120, and the rear side may be supported by the stator cover 137. The stator cover 137 may be formed in a hollow disk shape, have the outer stator 131 coupled to the front surface, and have the resonance spring 118 supported on the rear surface.

The stator cover 137 may be coupled to the rear of the outer stator 131, and the stator cover 137 may be connected to the piston 150 by an elastic member 136a. Through this, it is possible to stably reciprocate the piston 150 in the axial direction without any means such as a separate bearing for floating the piston 150 inside the cylinder 140. In this case, the elastic member 136a may be formed of a leaf spring, but is not limited thereto and may be variously changed.

The coil 132 may be mounted on the outer stator 131. The coil 132 may be wound around the outer stator 131. The outer stator 131 may be a magnetic material. When a current is applied, a magnetic flux may be formed in the outer stator 131 by the coil 132.

The outer stator 131 may include a stator core 131a, a teeth portion 131b, and a teeth shoe 131c.

The stator core 131a may be coupled to the frame 120. A cross-section of the stator core 131a may be formed in a circular shape. The stator core 131a may be formed in a cylindrical shape with open upper and lower portions. The stator core 131a may be formed in a circular ring shape. The teeth portion 131b may be formed on the inner circumferential surface of the stator core 131a.

The outer stator 131 may include a plurality of core plates 131a1, 131a2, . . . , 131an. The plurality of core plates 131a1, 131a2, . . . , 131an may be stacked in an axial direction or a front-rear direction of the linear compressor 100. The plurality of core plates 131a1, 131a2, . . . , 131an can include the stator core 131a, the teeth portion 131b, and the teeth shoe 131c. For example, as the plurality of core plates 131a1, 131a2, . . . , 131an are stacked in the axial direction or the front-rear direction of the linear compressor 100, the length of the stator core 131a and the teeth portion 131b in the axial direction is increased, accordingly, since the amount of the coil 132 wound around the teeth portion 131b is increased, it is possible to reduce the outer diameter of the driving unit 130. In addition, by reducing the outer diameter of the driving unit 130, it is possible to reduce the height of the linear compressor 100 in the vertical direction. When using the same amount of coil 132, it is possible to reduce the height of the linear compressor 100 by reducing the outer diameter of the transverse magnetic flux type reciprocating motor.

The teeth portion 131b may extend to the inside of the stator core 131a. The coil 132 may be disposed on the teeth portion 131b. The coil 132 may be wound around the teeth portion 131b. When a current is applied to the coil 132, the magnetic flux may be formed in the teeth portion 131b, the stator core 131a, and the teeth shoe 131c by the coil 132. The teeth shoe 131c extending in the circumferential direction may be formed at an inner end of the teeth portion 131b. A cross-section of the teeth portion 131b may be a square, but is not limited thereto, and may be formed in a circular or polygonal shape other than a square.

The teeth portion 131b may include a plurality of teeth portions 131b1, 131b2, 131b3, and 131b4. The plurality of teeth portions 131b1, 131b2, 131b3, and 131b4 may be formed in an even number. The plurality of teeth portions 131b1, 131b2, 131b3, and 131b4 may be spaced apart from each other in the circumferential direction. The plurality of teeth portions 131b1, 131b2, 131b3, and 131b4 may be disposed at positions symmetrical to each other with respect to the center of the outer stator 131. The plurality of teeth portions 131b1, 131b2, 131b3, and 131b4 may be disposed radially with respect to the center of the outer stator 131. The plurality of teeth portions 131b1, 131b2, 131b3, and 131b4 may be disposed at positions symmetrical to each other with respect to the center of the piston 150. Each of the plurality of teeth portions 131b1, 131b2, 131b3, and 131b4 may have the same separation distance and/or angle in the circumferential direction.

The plurality of teeth portions 131b1, 131b2, 131b3, 131b4 may include a first teeth portion 131b1, a second teeth portion 131b2 spaced apart from the first teeth portion 131b1 in the circumferential direction, a third teeth portion 131b3 spaced apart from the second teeth portion 131b2 in the circumferential direction, and a fourth teeth portion 131b4 spaced apart from the third teeth portion 131b2 in the circumferential direction. Each of the first to fourth teeth portions 131b1, 131b2, 131b3, and 131b4 may be wound with first to fourth coils 132a, 132b, 132c, and 132d. In the embodiment of the present disclosure, a description is given that the plurality of teeth portions 131b1, 131b2, 131b3, and 131b4 are four as an example, but is not limited thereto, and the number of the plurality of teeth portions 131b1, 131b2, 131b3, and 131b4 may be variously changed.

The teeth shoe 131c may extend in the circumferential direction from the inside of the teeth portion 131b. Specifically, the teeth shoe 131c may extend in the circumferential direction from the inner end of the teeth portion 131b. The teeth shoe 131c may be formed in an arc shape. The teeth shoe 131c may face the inner stator 134. The magnet 135 may be disposed on the teeth shoe 131c. The magnet 135 may be disposed on an inner surface of the teeth shoe 131c. The virtual pole 136 may be disposed on the teeth shoe 131c. The virtual pole 136 may be disposed on the inner surface of the teeth shoe 131c.

The teeth shoe 131c may include a plurality of teeth shoes 131c1, 131c2, 131c3, and 131c4. The plurality of teeth shoes 131c1, 131c2, 131c3, and 131c4 may be formed in an even number. The plurality of teeth shoes 131c1, 131c2, 131c3, and 131c4 may be spaced apart from each other in the circumferential direction. The plurality of teeth shoes 131c1, 131c2, 131c3, and 131c4 may be disposed at positions symmetrical to each other with respect to the center of the outer stator 131. The plurality of teeth shoes 131c1, 131c2, 131c3, and 131c4 may be disposed radially with respect to the center of the outer stator 131. The plurality of teeth shoes 131c1, 131c2, 131c3, and 131c4 may be disposed at positions symmetrical to each other with respect to the center of the piston 150. Each of the plurality of teeth shoes 131c1, 131c2, 131c3, and 131c4 may have the same separation distance and/or angle in the circumferential direction.

The plurality of teeth shoes 131c1, 131c2, 131c3, and 131c4 may include a first teeth shoe 131c1, a second teeth shoe 131c2 spaced apart from the first teeth shoe 131c1 in the circumferential direction, a third teeth shoe 131c3 spaced apart from the second teeth shoe 131c2 in the circumferential direction, and a fourth teeth shoe 131c4 spaced apart from the third teeth shoe 131c3 in the circumferential direction. Each of the first to fourth teeth shoes 131c1, 131c2, 131c3, and 131c4 may be connected to each of the first to fourth teeth portions 131b1, 131b2, 131b3, and 131b4. In the embodiment of the present disclosure, a description is given that the plurality of teeth shoes 131c1, 131c2, 131c3, and 131c4 are four as an example, but is not limited thereto, and the number of the plurality of teeth shoes 131c1, 131c2, 131c3, and 131c4 may be variously changed.

The coil 132 may be disposed on the outer stator 131. The coil 132 may be disposed on the teeth portion 131*b* of the outer stator 131. The coil 132 may be wound around the teeth portion 131*b* of the outer stator 131. A current may be supplied to the coil 132. A cross-section of the coil 132 may be formed in a circular or polygonal shape. For example, the cross-section of the coil 132 may have a hexagonal shape.

The coil 132 may include a plurality of coils 132*a*, 132*b*, 132*c*, and 132*d*. Each of the plurality of coils 132*a*, 132*b*, 132*c*, and 132*d* may be wound around each of the plurality of teeth portions 131*b*1, 131*b*2, 131*b*3, and 131*b*4. The plurality of coils 132*a*, 132*b*, 132*c*, and 132*d* may be formed in an even number. The plurality of coils 132*a*, 132*b*, 132*c*, and 132*d* may be spaced apart from each other in the circumferential direction. The plurality of coils 132*a*, 132*b*, 132*c*, and 132*d* may be disposed at positions symmetrical to each other with respect to the center of the outer stator 131. The plurality of coils 132*a*, 132*b*, 132*c*, and 132*d* may be disposed radially with respect to the center of the outer stator 131. Through this, it is possible to improve the stability of the inner stator 134 and the piston 150 reciprocating in the axial direction.

The plurality of coils 132*a*, 132*b*, 132*c*, and 132*d* may be disposed at positions symmetrical to each other with respect to the center of the piston 150. Each of the plurality of coils 132*a*, 132*b*, 132*c*, and 132*d* may have the same separation distance and/or angle in the circumferential direction. Each of the plurality of coils 132*a*, 132*b*, 132*c*, and 132*d* may have a magnetic flux formed in a direction opposite to that of a coil adjacent in the circumferential direction. Through this, the inner stator 134 and the piston 150 can stably reciprocate in the axial direction.

The plurality of coils 132*a*, 132*b*, 132*c*, and 132*d* may include a first coil 132*a*, a second coil 132*b* spaced apart from the first coil 132*a* in the circumferential direction, a third coil 132*c* spaced apart from the second coil 132*b* in the circumferential direction, and a fourth coil 132*d* spaced apart from the third coil 132*c* in the circumferential direction. Each of the first to fourth coils 132*a*, 132*b*, 132*c*, and 132*d* may be wound around each of the first to fourth teeth portions 131*b*1, 131*b*2, 131*b*3, and 131*b*4. The first coil 132*a* and the third coil 132*c* may be wound in the same direction. The first coil 132*a* and the third coil 132*c* may have magnetic fluxes formed in the same direction. The first coil 132*a* may be wound in different directions from the second coil 132*b* and the fourth coil 132*d* adjacent to each other. The first coil 132*a* may have magnetic fluxes formed in different directions from the second coil 132*b* and the fourth coil 132*d* adjacent to each other.

As shown in FIG. 7, when a current flows through the first coil 132*a* and the second coil 132*b*, the magnetic flux may be formed in a direction sequentially passing through the first teeth portion 131*b*1, the stator core 131*a*, and the second teeth portion 131*b*2, in this case, the inner stator 134 may be moved forward. The forward may mean an upward direction based on FIG. 7.

When a current flows in the opposite direction, the magnetic flux may be formed in a direction sequentially passing through the second teeth portion 131*b*2, the stator core 131*a*, and the first teeth portion 131*b*1, in this case, the inner stator 134 may be moved backward. The backward may mean a downward direction based on FIG. 7.

In the embodiment of the present disclosure, a description is given that the plurality of coils 132*a*, 132*b*, 132*c*, and 132*d* are four as an example, but is not limited thereto, and the number of the plurality of coils 132*a*, 132*b*, 132*c*, and 132*d* may be variously changed.

The inner stator 134 may be disposed in the outer stator 131. The inner stator 134 may be coupled to the outer circumferential surface of the piston 150. The inner stator 134 may be formed in a circular ring shape. The inner stator 134 may be formed in a cylindrical shape of which upper and lower portions are opened.

The inner stator 134 may be a magnetic material. The inner stator 134 may reciprocate in the axial direction by electromagnetic interaction with the coil 132. Specifically, when a current is applied to the coil 132, a magnetic flux is formed in the outer stator 131, and accordingly, the inner stator 134 may reciprocate in the axial direction. In the present disclosure, the axial direction may mean a direction in which the piston moves with reference to FIG. 2 and a vertical direction with reference to FIG. 6.

Figure 9:
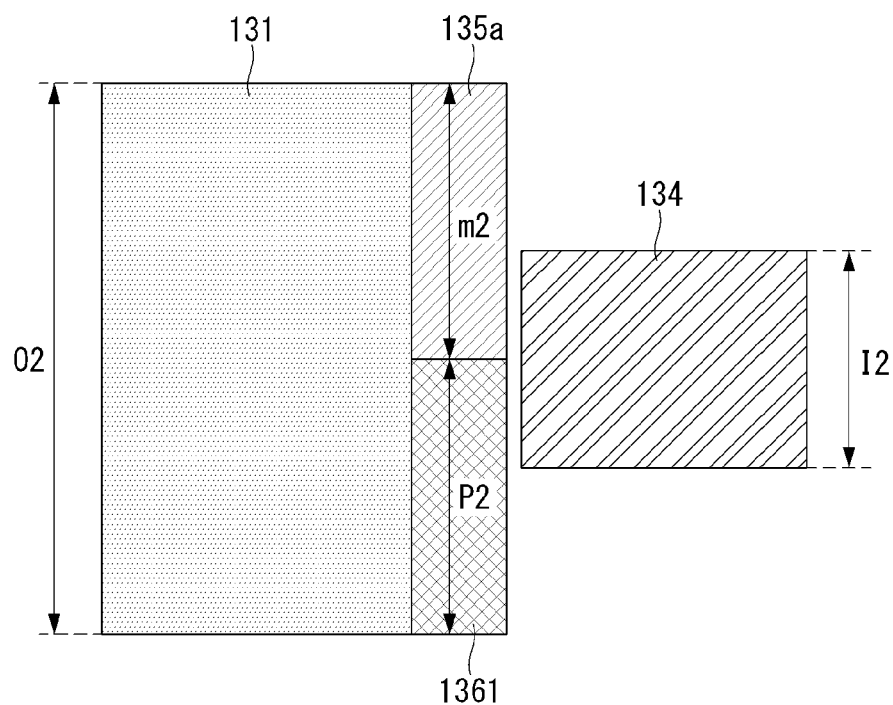

The inner stator 134 may face the magnet 135. An axial length of the inner stator 134 may correspond to an axial length of the magnet 135. Through this, the magnetic interaction efficiency of the inner stator 134 for the magnet 135 may be maximized. The inner stator 134 may face the virtual pole 136. The axial length of the inner stator 134 may be equal to or smaller than an axial length of the virtual pole 136. The inner stator 134 may be returned to its original position as shown in FIG. 9 by the magnet 135. This will be described later.

The magnet 135 may be disposed on the outer stator 131. The magnet 135 may be disposed on the teeth shoe 131*c* of the outer stator 131. The magnet 135 may be disposed on the inner surface of the teeth shoe 131*c* of the outer stator 131. The magnet 135 may be disposed in front or behind the virtual pole 136. The magnet 135 may be contact with the virtual pole 136. The magnet 135 may face the inner stator 134. The magnet 135 may overlap with the inner stator 134 in the radial direction.

The axial length of the magnet 135 may correspond to the axial length of the inner stator 134. The axial length of the magnet 135 may be equal to or smaller than the axial length of the virtual pole 136. A circumferential length of the magnet 135 may correspond to a circumferential length of the teeth shoe 131*c*. A radial thickness or length of the magnet 135 may correspond to a radial thickness or length of the virtual pole 136.

The magnet 135 may include a plurality of magnets 135*a*, 135*b*, 135*c*, and 135*d*. The plurality of magnets 135*a*, 135*b*, 135*c*, and 135*d* may be formed in an even number. The plurality of magnets 135*a*, 135*b*, 135*c*, and 135*d* may have the same polarity. Through this, when the plurality of magnets 135*a*, 135*b*, 135*c*, and 135*d* are disposed on the plurality of teeth shoes 131*c*1, 131*c*2, 131*c*3, and 131*c*4, it is possible to prevent an operator's error that may occur.

The plurality of magnets 135*a*, 135*b*, 135*c*, and 135*d* may be disposed on each of the first to fourth teeth shoes 131*c*1, 131*c*2, 131*c*3, and 131*c*4, respectively. Specifically, the plurality of magnets 135*a*, 135*b*, 135*c*, and 135*d* may include a first magnet 135*a* disposed on the first teeth shoe 131*c*1, a second magnet 135*b* disposed on the second teeth shoe 131*c*2, a third magnet 135*c* disposed on the third teeth shoe 131*c*3, and a fourth magnet 135*d* disposed on the fourth teeth shoe 131*c*4. Through this, stability of the magnetic interaction between the magnet 135 and the piston 150 may be improved.

The first magnet 135*a* may be disposed on an inner surface 131*c*11 of the first teeth shoe 131*c*1. The first magnet 135*a* may be disposed in a front area of the inner surface 131*c*11 of the first teeth shoe 131*c*1. The first magnet 135*a* may be disposed in front of a first virtual pole 1361. The first magnet 135*a* may be disposed with the third magnet 135*c* at a position symmetrical with respect to an axis passing through the center of the outer stator 131. Through this, it is possible to improve the efficiency the efficiency of the magnetic interaction between the magnet 135 and the piston 150 while using a small amount of the magnet 135. In an embodiment of the present disclosure, the first magnet 135*a* is described as being adjacent to the first virtual pole 1361 as an example, but is not limited thereto, and the first magnet 135*a* may be spaced apart from the first virtual pole 1361.

The second magnet 135*b* may be disposed on an inner surface 131*c*21 of the second teeth shoe 131*c*2. The second magnet 135*b* may be disposed in a rear area of the inner surface 131*c*21 of the second teeth shoe 131*c*2. The second magnet 135*b* may be disposed in a rear area of a second virtual pole 1362. The second magnet 135*b* may be disposed with the fourth magnet 135*d* at a position symmetrical with respect to an axis passing through the center of the outer stator 131. In an embodiment of the present disclosure, the second magnet 135*b* is described as being adjacent to the second virtual pole 1362 as an example, but is not limited thereto, and the second magnet 135*b* may be spaced apart from the second virtual pole 1362.

The third magnet 135*c* may be disposed on an inner surface 131*c*31 of the third teeth shoe 131*c*3. The third magnet 135*c* may be disposed in a front area of the inner surface 131*c*31 of the third teeth shoe 131*c*3. The third magnet 135*c* may be disposed in front of a third virtual pole 1363. The third magnet 135*c* may be disposed with the first magnet 135*a* at a position symmetrical with respect to an axis passing through the center of the outer stator 131. In an embodiment of the present disclosure, the third magnet 135*c* is described as being adjacent to the third virtual pole 1363 as an example, but is not limited thereto, and the third magnet 135*c* may be spaced apart from the third virtual pole 1363.

The fourth magnet 135*d* may be disposed on an inner surface 131*c*41 of the fourth teeth shoe 131*c*4. The fourth magnet 135*d* may be disposed in a rear area of the inner surface 131*c*41 of the fourth teeth shoe 131*c*4. The fourth magnet 135*d* may be disposed in a rear area of a fourth virtual pole 1364. The fourth magnet 135*d* may be disposed with the second magnet 135*b* at a position symmetrical with respect to an axis passing through the center of the outer stator 131. In an embodiment of the present disclosure, the fourth magnet 135*d* is described as being adjacent to the fourth virtual pole 1364 as an example, but is not limited thereto, and the fourth magnet 135*d* may be spaced apart from the fourth virtual pole 1364.

In the embodiment of the present disclosure, a description is given that the plurality of magnets 135*a*, 135*b*, 135*c*, and 135*d* are four as an example, but is not limited thereto, and the number of the plurality of magnets 135*a*, 135*b*, 135*c*, and 135*d* may be variously changed, such as two or six.

The virtual pole 136 may be disposed on the outer stator 131. The virtual pole 136 may be disposed on the teeth shoe 131*c* of the outer stator 131. The virtual pole 136 may be disposed on the inner surface of the teeth shoe 131*c* of the outer stator 131. The virtual pole 136 may be disposed in front or behind the magnet 135. The virtual pole 136 may be contact with the magnet 135. The virtual pole 136 may face the inner stator 134. The virtual pole 136 may overlap with the inner stator 134 in the radial direction. The virtual pole 136 may be a magnetic material. The virtual pole 136 may be formed separately from the outer stator 131 and disposed on the outer stator 131, but the virtual pole 136 may be integrally formed with the outer stator 131. Specifically, the virtual pole 136 may be formed separately from the teeth shoe 131*c* of the outer stator 131 and may be disposed on the inner surface of the teeth shoe 131*c*, but the virtual pole 136 may be integrally formed with the inner surface of the teeth shoe 131*c* of the outer stator 131. Through this, it is possible to reduce additional costs with which the virtual pole 136 is formed separately and is coupled to the teeth shoe 131*c*.

The axial length of the virtual pole 136 may correspond to the axial length of the inner stator 134. The axial length of the virtual pole 136 may be equal to or longer than the axial length of the magnet 135. Through this, it is possible to improve the efficiency of the magnetic interaction between the virtual pole 136 and the piston 150 while using a small amount of the magnet 135. A circumferential length of the virtual pole 136 may correspond to the circumferential length of the teeth shoe 131*c*. The radial thickness of the virtual pole 136 may correspond to the radial thickness of the magnet 135.

Through this, it is possible to increase the amount of the coil 132 while using a smaller amount of the magnet 135 than the driving unit of the conventional linear compressor, so that it is possible to reduce the outer diameter of the driving unit 130 and reduce the cost of the product.

The virtual pole 136 may include a plurality of virtual poles 1361, 1362, 163, and 1364. The plurality of virtual poles 1361, 1362, 163, and 1364 may be formed in an even number. The plurality of virtual poles 1361, 1362, 163, and 1364 may be disposed on the first to fourth teeth shoes 131*c*1, 131*c*2, 131*c*3, and 131*c*4, respectively. Specifically, the plurality of virtual poles 1361, 1362, 163, and 1364 may include a first virtual pole 1361 disposed on the first teeth shoe 131*c*1, a second virtual pole 1362 disposed on the second teeth shoe 131*c*2, a third virtual pole 1363 disposed on the third teeth shoe 131*c*3, and a fourth virtual pole 1364 disposed on the fourth teeth shoe 131*c*4.

The first virtual pole 1361 may be disposed on the inner surface 131*c*11 of the first teeth shoe 131*c*1. The first virtual pole 1361 may be disposed in a rear area of the inner surface 131*c*11 of the first teeth shoe 131*c*1. The first virtual pole 1361 may be disposed behind the first magnet 135*a*. The first virtual pole 1361 may be disposed with the third virtual pole 1363 at a position symmetrical with respect to an axis passing through the center of the outer stator 131. In an embodiment of the present disclosure, the first virtual pole 1361 is described as being adjacent to the first magnet 135*a* as an example, but is not limited thereto, and the first virtual pole 1361 may be spaced apart from the first magnet 135*a*. The first virtual pole 1361 may be formed separately from the first teeth shoe 131*c*1 and disposed on the inner surface 131*c*11 of the first teeth shoe 131*c*1, but the first virtual pole 1361 may be integrally formed with the inner surface 131*c*11 of the first teeth shoe 131*c*1.

The second virtual pole 1362 may be disposed on the inner surface 131*c*21 of the second teeth shoe 131*c*2. The second virtual pole 1362 may be disposed in a front area of the inner surface 131*c*21 of the second teeth shoe 131*c*2. The second virtual pole 1362 may be disposed in front of the second magnet 135*b*. The second virtual pole 1362 may be disposed with the fourth virtual pole 1326 at a position symmetrical with respect to an axis passing through the center of the outer stator 131. In an embodiment of the present disclosure, the second virtual pole 1362 is described as being adjacent to the second magnet 135*b* as an example, but is not limited thereto, and the second virtual pole 1362 may be spaced apart from the second magnet 135*b*. The second virtual pole 1362 may be formed separately from the second teeth shoe 131*c*2 and disposed on the inner surface 131*c*21 of the second teeth shoe 131*c*2, but the second virtual pole 1362 may be integrally formed with the inner surface 131c21 of the second teeth shoe 131c2.

The third virtual pole 1363 may be disposed on the inner surface 131c31 of the third teeth shoe 131c3. The third virtual pole 1363 may be disposed in a rear area of the inner surface 131c31 of the third teeth shoe 131c3. The third virtual pole 1363 may be disposed behind the third magnet 135c. The third virtual pole 1363 may be disposed with the first virtual pole 1361 at a position symmetrical with respect to an axis passing through the center of the outer stator 131. In an embodiment of the present disclosure, the third virtual pole 1363 is described as being adjacent to the third magnet 135c as an example, but is not limited thereto, and the third virtual pole 1363 may be spaced apart from the third magnet 135c. The third virtual pole 1363 may be formed separately from the third teeth shoe 131c3 and disposed on the inner surface 131c31 of the third teeth shoe 131c3, but the third virtual pole 1363 may be integrally formed with the inner surface 131c31 of the third teeth shoe 131c3.

The fourth virtual pole 1364 may be disposed on the inner surface 131c41 of the fourth teeth shoe 131c4. The fourth virtual pole 1364 may be disposed in a front area of the inner surface 131c41 of the fourth teeth shoe 131c4. The fourth virtual pole 1364 may be disposed in front of the fourth magnet 135d. The fourth virtual pole 1364 may be disposed with the second virtual pole 1362 at a position symmetrical with respect to an axis passing through the center of the outer stator 131. In an embodiment of the present disclosure, the fourth virtual pole 1364 is described as being adjacent to the fourth magnet 135d as an example, but is not limited thereto, and the fourth virtual pole 1364 may be spaced apart from the fourth magnet 135d. The fourth virtual pole 1364 may be formed separately from the fourth teeth shoe 131c4 and disposed on the inner surface 131c41 of the fourth teeth shoe 131c4, but the fourth virtual pole 1364 may be integrally formed with the inner surface 131c41 of the fourth teeth shoe 131c4.

In the embodiment of the present disclosure, a description is given that the plurality of virtual poles 1361, 1362, 1363, and 1364 are four as an example, but is not limited thereto, and the number of the plurality of virtual poles 1361, 1362, 1363, and 1364 may be variously changed, such as two or six.

Figure 8:
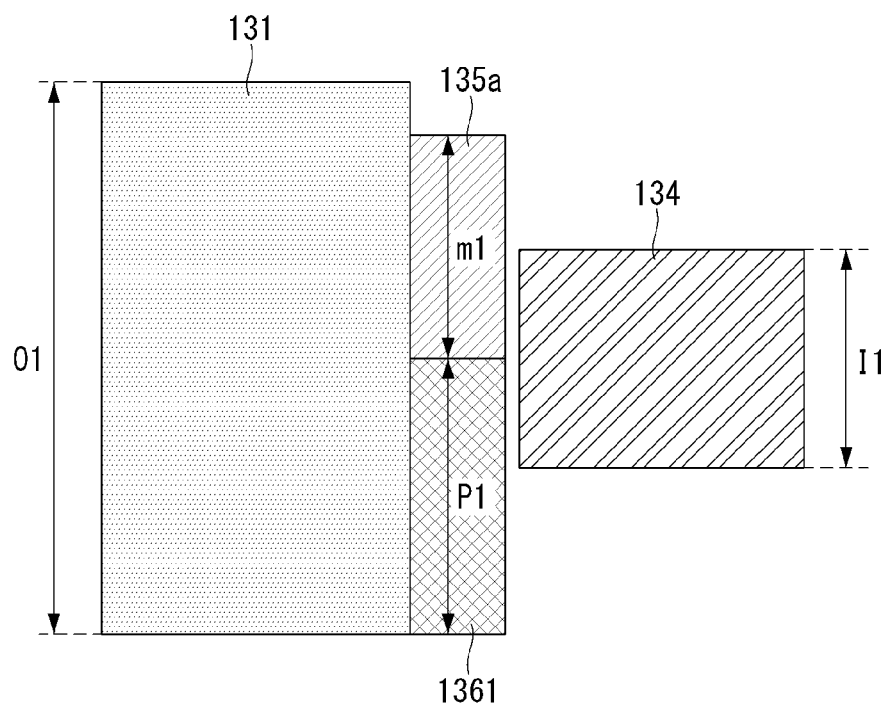
FIGS. 8 to 11 are schematic diagrams of a driving unit according to various embodiments of the present disclosure.

Referring to FIG. 8, an axial length O1 of the outer stator 131 may be greater than a sum of an axial length m1 of the magnet 135 and an axial length P1 of the virtual pole 136. In this case, an axial length I1 of the inner stator 134 may correspond to the axial length m1 of the magnet 135, and the axial length P1 of the virtual pole 136 may be greater than the axial length m1 of the magnet 135. Through this, it is possible to improve the axial movement stroke of the inner stator 134 and the piston 150 while using a small amount of the magnet 135.

As the outer stator 131 is formed by stacking the plurality of core plates 131a1, 131a2, ..., 131an, since the amount of the coil 132 may be increased by increasing the axial length of the outer stator 131, it is possible to reduce the outer diameter of the driving unit 130 while producing the same output. In addition, by reducing the outer diameter of the driving unit 130, it is possible to reduce the height of the linear compressor 100 in the vertical direction. In addition, by using one magnet and one virtual pole instead of two magnets disposed in the axial direction, the amount of magnets can be reduced compared to the conventional one, and thus the cost of the product can be reduced.

Referring to FIG. 9, an axial length O2 of the outer stator 131 may correspond to a sum of an axial length m2 of the magnet 135 and an axial length P2 of the virtual pole 136. In this case, an axial length I2 of the inner stator 134 may correspond to the axial length m2 of the magnet 135 and/or the axial length P2 of the virtual pole 136, and the axial length m2 of the magnet 135 may correspond to the axial length P2 of the virtual pole 136.

In addition, by using one magnet and one virtual pole instead of two magnets disposed in the axial direction, the amount of magnets can be reduced compared to the conventional one, and thus the cost of the product can be reduced.

In addition, when it is assumed that one magnet uses the same amount as the existing two magnets, while using the same amount of magnet as the existing, since the amount of the coil 132 can be increased by increasing the axial length of the outer stator 131, it is possible to reduce the outer diameter of the driving unit 130 while producing the same output. In addition, by reducing the outer diameter of the driving unit 130, it is possible to reduce the height of the linear compressor 100 in the vertical direction.

Figure 10:
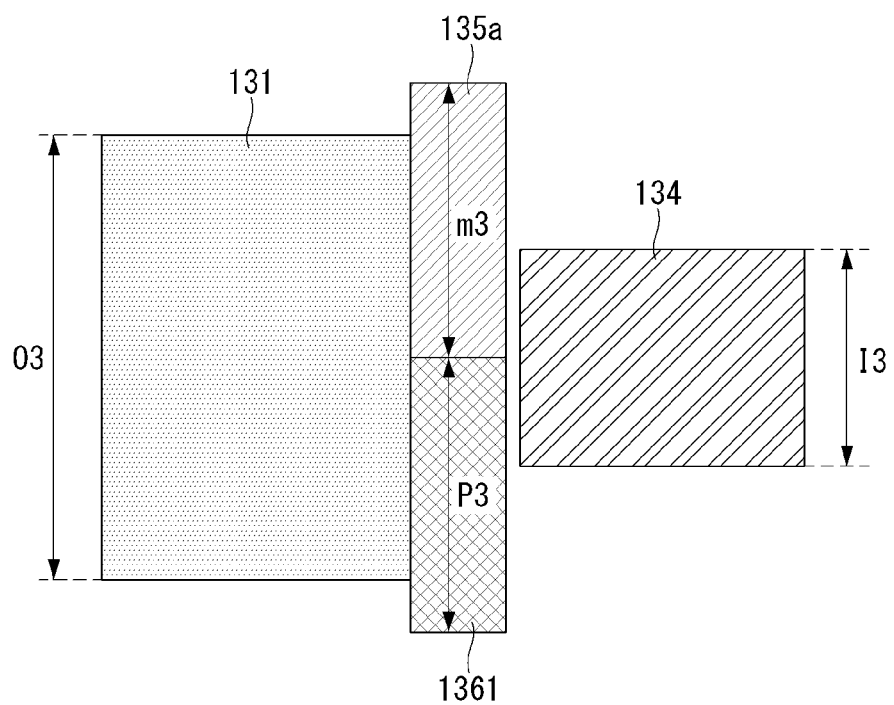

Referring to FIG. 10, an axial length O3 of the outer stator 131 may be smaller than a sum of an axial length m3 of the magnet 135 and an axial length P3 of the virtual pole 136. In this case, an axial length I3 of the inner stator 134 may correspond to the axial length m3 of the magnet 135 and/or the axial length P3 of the virtual pole 136, and the axial length m3 of the magnet 135 may correspond to the axial length P3 of the virtual pole 136.

In addition, by using one magnet and one virtual pole instead of two magnets disposed in the axial direction, the amount of magnets can be reduced compared to the conventional one, and thus the cost of the product can be reduced.

In addition, when it is assumed that one magnet uses the same amount as the existing two magnets, while using the same amount of magnet as the existing, since the amount of the coil 132 can be increased by increasing the axial length of the outer stator 131, it is possible to reduce the outer diameter of the driving unit 130 while producing the same output. In addition, by reducing the outer diameter of the driving unit 130, it is possible to reduce the height of the linear compressor 100 in the vertical direction.

Figure 11:
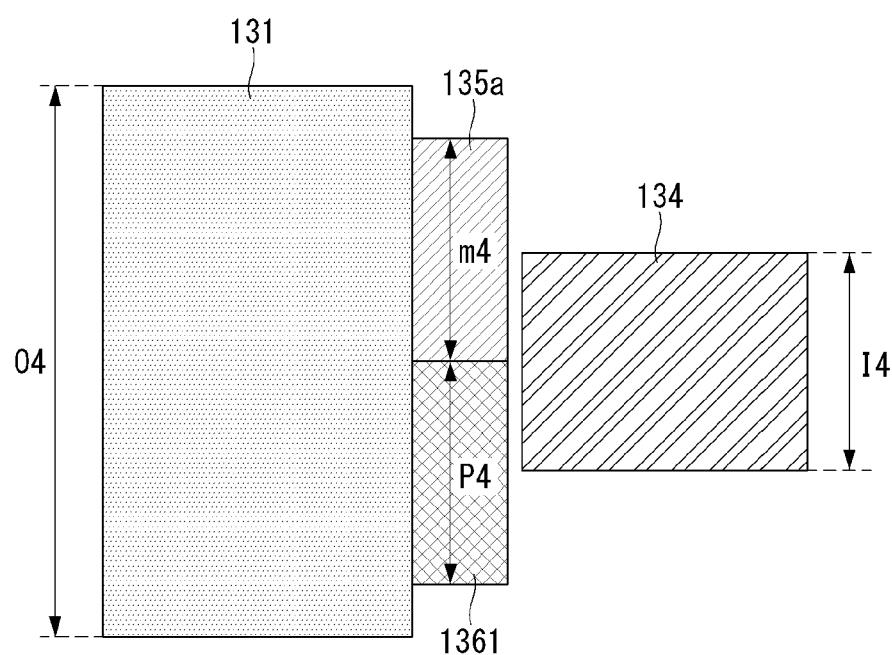

Referring to FIG. 11, an axial length O4 of the outer stator 131 may be greater than a sum of an axial length m4 of the magnet 135 and an axial length P4 of the virtual pole 136. In this case, an axial length I4 of the inner stator 134 may correspond to the axial length m4 of the magnet 135 and/or the axial length P4 of the virtual pole 136, and the axial length m4 of the magnet 135 may correspond to the axial length P4 of the virtual pole 136.

As the outer stator 131 is formed by stacking the plurality of core plates 131a1, 131a2, ..., 131an, since the amount of the coil 132 may be increased by increasing the axial length of the outer stator 131, it is possible to reduce the outer diameter of the driving unit 130 while producing the same output. In addition, by reducing the outer diameter of the driving unit 130, it is possible to reduce the height of the linear compressor 100 in the vertical direction. In addition, by using one magnet and one virtual pole instead of two magnets disposed in the axial direction, the amount of magnets can be reduced compared to the conventional one, and thus the cost of the product can be reduced.

Referring to FIGS. 7 and 12, the first magnet 135a may have the same polarity as the second magnet 135b, and the first virtual pole 1361 and the second virtual pole 1362, which are magnetic, may have a polarity different from that of the first magnet 135a and the second magnet 135b. For example, the first magnet 135a and the second magnet 135b may have the N pole, and the first virtual pole 1361 and the second virtual pole 1362 may have relatively the S pole.

Referring to FIG. 13, when a current is supplied to the coil 132 to form a magnetic flux in the outer stator 131 in one direction, the inner stator 134 moves to the left with reference to FIG. 13. In this case, one area of the inner stator 134 facing the first virtual pole 1361 and the first magnet 135a has the S pole, and the other area of the inner stator 134 facing the second virtual pole 1362 and the second magnet 135b has the N pole. That is, between the inner stator 134 and the magnet 135, a reciprocating direction centering force F1 to return to a direction in which magnetic energy (i.e. magnetic potential energy or magnetic resistance) is low, the right direction of FIG. 10, may act. This reciprocating direction centering force F1 may return the inner stator 134 to a central area 131ca of the outer stator 131.

Referring to FIG. 14, when a current is supplied to the coil 132 to form a magnetic flux in the outer stator 131 in the other direction, the inner stator 134 moves to the right with reference to FIG. 14. In this case, one area of the inner stator 134 facing the first virtual pole 1361 and the first magnet 135a has the N pole, and the other area of the inner stator 134 facing the second virtual pole 1362 and the second magnet 135b has the S pole. That is, between the inner stator 134 and the magnet 135, a reciprocating direction centering force F2 to return to a direction in which magnetic energy (i.e. magnetic potential energy or magnetic resistance) is low, the left direction of FIG. 10, may act. This reciprocating direction centering force F2 may return the inner stator 134 to the central area 131ca of the outer stator 131.

That is, when the inner stator 134 moves in a direction away from the central area 131ca of the outer stator 131, a reciprocating direction central force to return to the central area 131ca of the outer stator 131 by the magnetic force of the magnet 135 acts on the inner stator 134. This force may be referred to as a magnetic resonance spring. The inner stator 134 and the piston 150 may perform resonance motion by this magnetic resonance spring. In this case, the linear compressor 100 according to an embodiment of the present disclosure may be implemented except for the resonance spring 118. Thereby, in addition, it is possible to solve the limitation on the mechanical stress limit and the vibration distance by removing the mechanical resonance spring, and it is possible to reduce friction loss between the inner stator 134, and the outer stator 131 caused by eccentricity of the piston 150 by lateral force.

The driving unit 130 according to another embodiment of the present disclosure may include the outer stator 131, the coil 132, the inner stator 134, the magnet 135, and the virtual pole. The detailed configuration of the driving unit 130 according to another embodiment of the present disclosure may be understood to be the same as the detailed configuration of the driving unit 130 according to an embodiment of the present disclosure.

A virtual pole according to another embodiment of the present disclosure may be integrally formed with the outer stator 131. Specifically, the virtual pole may be integrally formed with the teeth shoe 131c of the outer stator 131. In this case, the virtual pole and the outer stator 131 may be formed of a magnetic material.

That is, the teeth shoe 131c may comprise a step portion formed on an inner surface, and the magnet 135 may be disposed on the step portion on the inner surface of the teeth shoe.

Specifically, referring to FIG. 7, the teeth shoe 131c may comprise first to fourth step portions 131c11, 131c21, 131c31, and 131c41 formed on each of the first to fourth inner surfaces 131c11, 131c21, 131c31, and 131c41. In this case, each of the first to fourth magnets 135a, 135b, 135c, and 135d may be disposed on each of the first to fourth step portions 131c11, 131c21, 131c31, and 131c41. In this case, it goes without saying that a radial length of the teeth shoe 131c may correspond to a sum of the radial length of the teeth shoe 131c and a radial length of the virtual pole 136 according to an embodiment of the present disclosure.

In addition, the first step portion 131c11 may be formed in a front area of the first teeth shoe 131c1, the second step portion 131c21 may be formed in a rear area of the second teeth shoe 131c2, the third step portion 131c31 may be formed in a front area of the third teeth shoe 131c3, and the fourth step portion 131c41 may be formed in a rear area of the fourth teeth shoe 131c4.

In addition, the axial length of the magnet 135 may be formed equal to or smaller than an axial length of the step portion.

According to the driving unit 130 according to another embodiment of the present disclosure, by forming the virtual pole integrally with the teeth shoe 131c, it is possible to improve the ease of manufacture.

The driving unit 130 according to still another embodiment of the present disclosure may include the outer stator 131, the coil 132, the inner stator 134, the magnet 135, and the virtual pole. The detailed configuration of the driving unit 130 according to another embodiment of the present disclosure, which is not described below may be understood to be the same as the detailed configuration of the driving unit 130 according to an embodiment of the present disclosure.

A virtual pole according to still another embodiment of the present disclosure may be integrally formed with the outer stator 131. Specifically, the virtual pole may be integrally formed with the teeth shoe 131c of the outer stator 131. In this case, the virtual pole and the outer stator 131 may be formed of a magnetic material. In this case, the virtual poles according to an embodiment of the present disclosure may be replaced with protrusions 1361, 1362, 1363, and 1364 according to still another embodiment of the present disclosure. Specifically, the teeth shoe 131c may comprise a protrusion 136 formed on an inner surface, and the magnet 135 may be disposed on the inner surface of the teeth shoe 131c.

Referring to FIG. 7, the teeth shoe 131c may comprise first to fourth protrusions 1361, 1362, 1363, and 1364 protruding inward from each of the first to fourth inner surfaces 131c11, 131c21, 131c31, and 131c41. In this case, each of the first to fourth magnets 135a, 135b, 135c, and 135d may be disposed on each of the first to fourth inner surfaces 131c11, 131c21, 131c31, and 131c41. In this case, it goes without saying that a radial length of the protrusions 1361, 1362, 1363, and 1364 may correspond to the radial length of the virtual pole 136 according to an embodiment of the present disclosure.

According to the driving unit 130 according to still another embodiment of the present disclosure, by forming the virtual pole integrally with the teeth shoe 131c, it is possible to improve the ease of manufacture.

Figure 15:
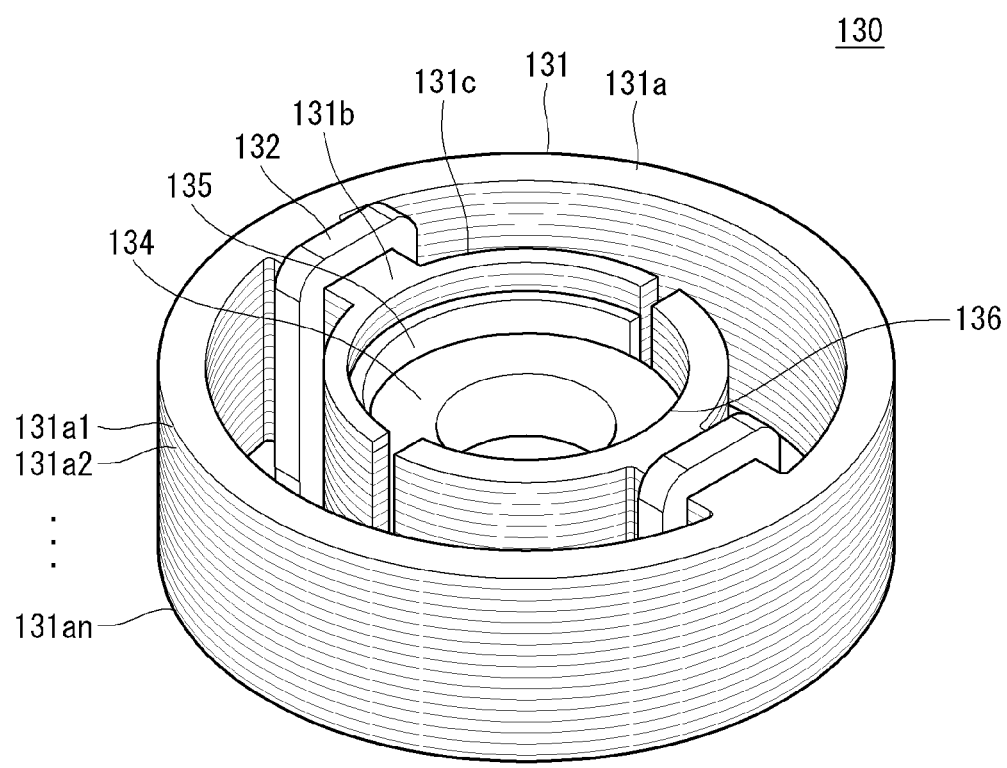
FIG. 15 is a perspective view of a driving unit according to another embodiment of the present disclosure.
Figure 16:
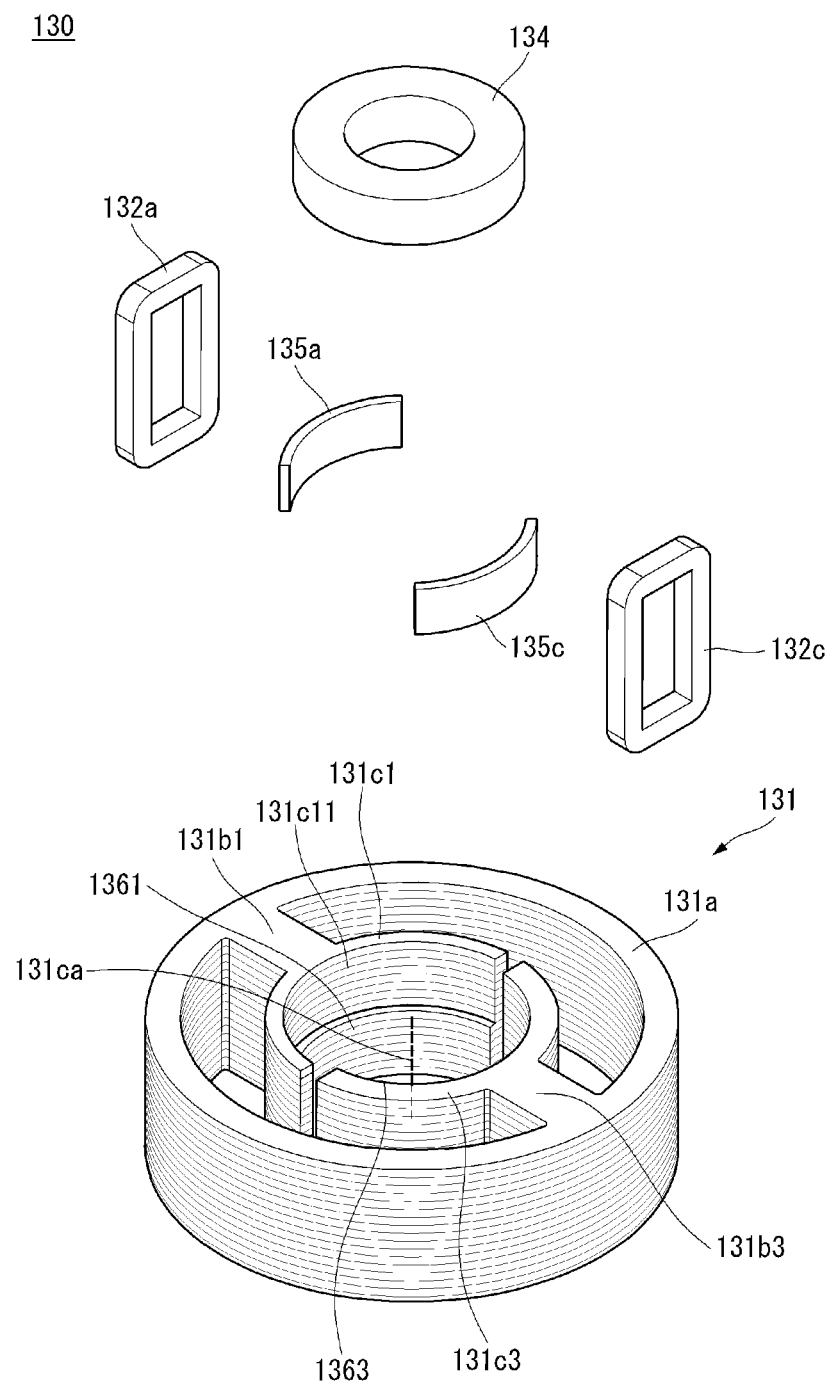
FIG. 16 is an exploded perspective view of a driving unit according to another embodiment of the present disclosure.
Figure 17:
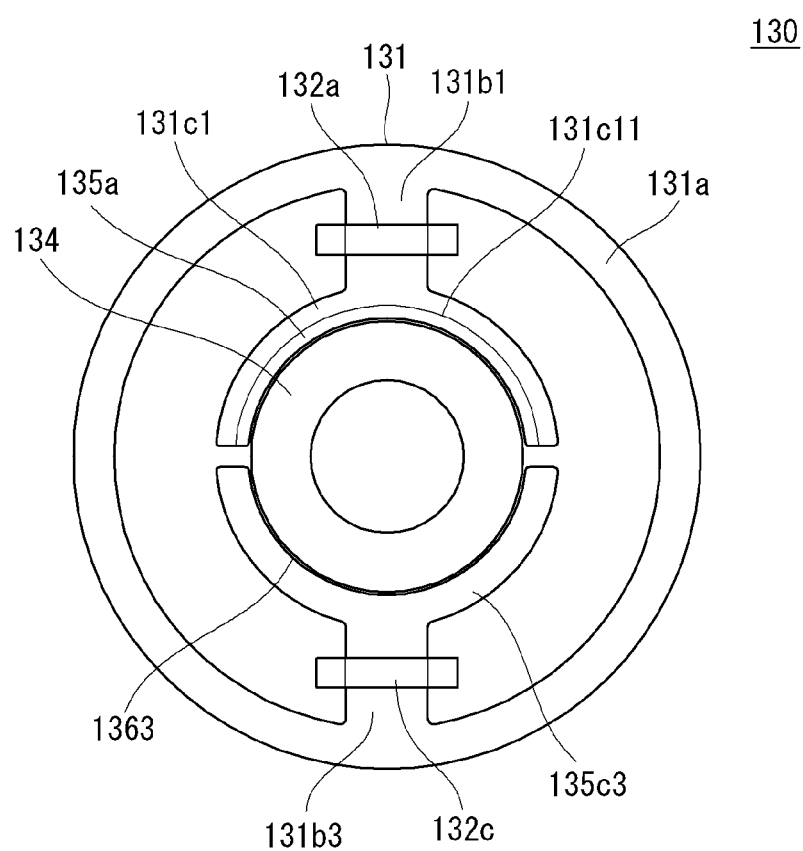
FIG. 17 is a plane view of a driving unit according to another embodiment of the present disclosure.
Figure 18:
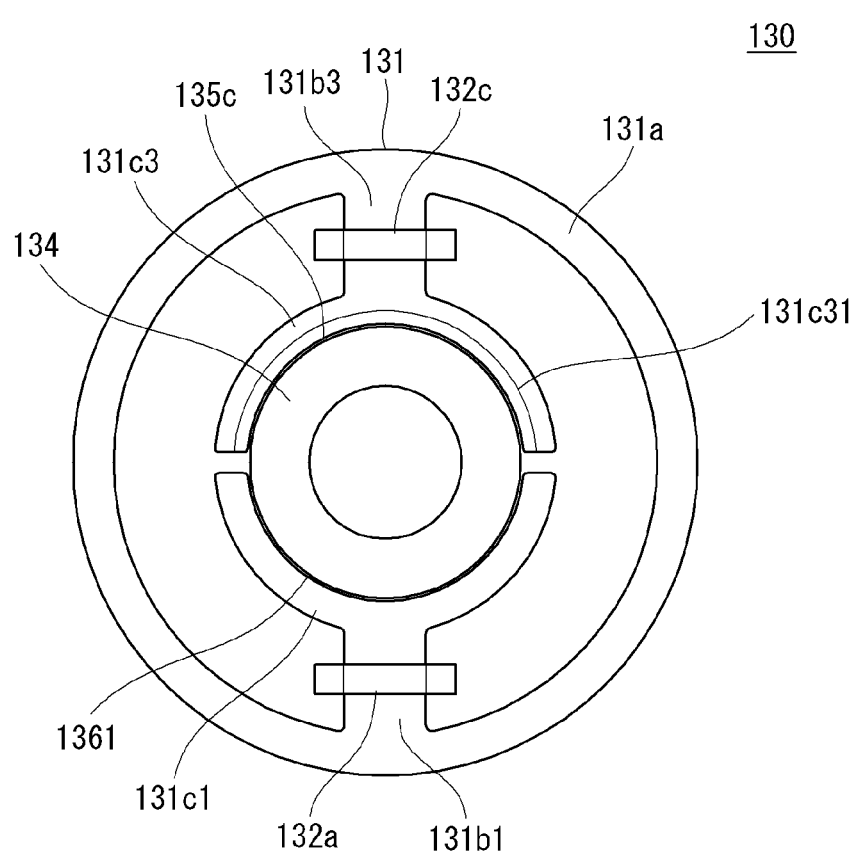
FIG. 18 is a bottom view of a driving unit according to another embodiment of the present disclosure.

FIG. 15 is a perspective view of a driving unit according to another embodiment of the present disclosure. FIG. 16 is an exploded perspective view of a driving unit according to another embodiment of the present disclosure. FIG. 17 is a plane view of a driving unit according to another embodiment of the present disclosure. FIG. 18 is a bottom view of a driving unit according to another embodiment of the present disclosure.

Referring to FIGS. 1 and 15 to 18, the linear compressor 100 according to another embodiment of the present disclosure may include a frame 120, a driving unit 130, a cylinder 140, and a piston 150, but it does not exclude additional components. The detailed configuration of the linear compressor 100 and the detailed configuration of the frame 120, the driving unit 130, the cylinder 140, and the piston 150 according to another embodiment of the present disclosure, which is not described below, may be understood to be the same as the detailed configuration of the linear compressor 100, and the detailed configuration of the frame 120, the driving unit 130, the cylinder 140, and the piston 150 according to an embodiment of the present disclosure.

The driving unit 130 may be a transverse magnetic flux type reciprocating motor in which a direction of a magnetic flux and a direction of a linear movement of the piston 150 form a right angle. In the embodiment of the present disclosure, the driving unit 130 may be referred to as a "transverse magnetic flux type reciprocating motor."

The driving unit 130 may include an outer stator 131, a coil 132, an inner stator 134, a magnet 135, and a virtual pole 136.

The outer stator 131 may include a stator core 131a, a teeth portion 131b, and a teeth shoe 131c.

The teeth portion 131b, the teeth shoe 131c, the coil 132, the magnet 135, and the virtual pole 136 according to another embodiment of the present disclosure may be formed of two, respectively.

The teeth portion 131b may include a first teeth portion 131b1 and a second teeth portion 131b3 extending inward of the stator core 131a. The first teeth portion 131b1 and the second teeth portion 131b3 may be formed at positions symmetrical to each other with respect to the central area 131ca of the outer stator 131. The first teeth portion 131b1 and the second teeth portion 131b3 may be formed in a shape corresponding to each other. A first coil 132a may be wound around the first teeth portion 131b1, and a second coil 132c may be wound around the second teeth portion 131b3. The first coil 132a and the second coil 132c may be wound in different directions.

The teeth shoe 131c may include a first teeth shoe 131c1 and a second teeth shoe 131c3 extending in a circumferential direction from an inner end of the teeth portion 131b. The first teeth shoe 131c1 may extend in the circumferential direction from the inner end of the first teeth portion 131b1. The second teeth shoe 131c3 may extend in the circumferential direction from the inner end of the second teeth portion 131b3. The first teeth shoe 131c1 and the second teeth shoe 131c3 may be formed at positions symmetrical to each other with respect to the central area 131ca of the outer stator 131. The first teeth shoe 131c1 and the second teeth shoe 131c3 may be formed in a shape corresponding to each other.

The teeth shoe 131c may include a first teeth shoe 131c1 and a second teeth shoe 131c3 extending in a circumferential direction from an inner end of the teeth portion 131b. The first teeth shoe 131c1 may extend in the circumferential direction from the inner end of the first teeth portion 131b1. The second teeth shoe 131c3 may extend in the circumferential direction from the inner end of the second teeth portion 131b3. The first teeth shoe 131c1 and the second teeth shoe 131c3 may be formed at positions symmetrical to each other with respect to the central area of the outer stator 131. The first teeth shoe 131c1 and the second teeth shoe 131c3 may be formed in a shape corresponding to each other. The first teeth shoe 131c1 and the second teeth shoe 131c3 may face each other.

A first magnet 135a and a first virtual pole 1361 may be disposed on the inner surface of the first teeth shoe 131c1. A second magnet 135c and a second virtual pole 1363 may be disposed on the inner surface of the second teeth shoe 131c3.

The first magnet 135a may be disposed in front in the axial direction of the first virtual pole 1361, and the second magnet 135c may be disposed behind in the axial direction of the second virtual pole 1363.

The teeth portion 131b, the teeth shoe 131c, the coil 132, the magnet 135, and the virtual pole 136 of the linear compressor 100 according to another embodiment of the present disclosure are each formed of two, so that it is possible to improve the ease of manufacture compared to the driving unit 130 of the linear compressor 100 according to an embodiment of the present disclosure.

Some or other embodiments of the present disclosure described above are not exclusive or distinct from one another. Some or other embodiments of the present disclosure described above may be used in combination or combined with each configuration or function.

For example, it means that configuration A described in specific embodiments and/or drawings and configuration B described in other embodiments and/or drawings may be combined. In other words, even when the combination between the components is not described directly, it means that the combination is possible except when it is described as not possible to combine.

The above detailed description should not be construed as limiting in all respects and should be considered as illustrative. The scope of the present disclosure should be determined by reasonable interpretation of the appended claims, and all changes within the equivalent scope of the present disclosure are included in the scope of the present disclosure.

What is claimed is:

1. A linear compressor comprising:
a frame;
an outer stator comprising a plurality of core plates stacked in an axial direction, the plurality of core plates including:
a stator core disposed on the frame,
a teeth portion that extends radially inward from the stator core, and
a teeth shoe that extends in a circumferential direction from an inner end of the teeth portion;
a coil disposed on the teeth portion;
a cylinder disposed on the frame;
a piston disposed in the cylinder;
an inner stator coupled to an outer circumferential surface of the piston and configured to reciprocate in the axial direction based on electromagnetic interaction with the coil;
a magnet that is disposed on the teeth shoe and faces the inner stator; and
a virtual pole that is disposed on the teeth shoe and faces the inner stator, the virtual pole being disposed in front of or behind the magnet in the axial direction,
wherein the teeth shoe comprises a first teeth shoe, a second teeth shoe, a third teeth shoe, and a fourth teeth shoe that are spaced apart from one another in the circumferential direction, wherein the magnet comprises a first magnet disposed at an inner surface of the first teeth shoe, a second magnet disposed at an inner surface of the second teeth shoe, a third magnet disposed at an inner surface of the third teeth shoe, and a fourth magnet disposed at an inner surface of the fourth teeth shoe, and wherein the virtual pole comprises:
a first virtual pole disposed on the inner surface of the first teeth shoe and disposed behind the first magnet,
a second virtual pole disposed on the inner surface of the second teeth shoe and disposed in front of the second magnet,
a third virtual pole disposed on the inner surface of the third teeth shoe and disposed behind the third magnet, and
a fourth virtual pole disposed on the inner surface of the fourth teeth shoe and disposed in front of the fourth magnet.

2. The linear compressor of claim 1, wherein the coil comprises a plurality of coils that are spaced apart from one another in the circumferential direction, the plurality of coils having an even number of coils, and
wherein neighboring coils among the plurality of coils in the circumferential direction are configured to generate magnetic fluxes in opposite directions from each other.

3. The linear compressor of claim 1, wherein the coil comprises a plurality of coils that are spaced apart from one another in the circumferential direction, the plurality of coils having an even number of coils, and
wherein each of the plurality of coils is disposed radially spaced apart from a central area of the outer stator.

4. The linear compressor of claim 1, wherein an axial length of the inner stator is equal to an axial length of the magnet in the axial direction.

5. The linear compressor of claim 1, wherein the virtual pole is integrally formed with the teeth shoe.

6. The linear compressor of claim 1, wherein a radial length of the virtual pole is equal to a radial length of the magnet.

7. The linear compressor of claim 1, further comprising:
a stator cover coupled to a rear of the outer stator; and
an elastic member that connects the piston to the stator cover.

8. A linear compressor comprising:
a frame;
an outer stator comprising a plurality of core plates stacked in an axial direction, the plurality of core plates including:
a stator core disposed on the frame,
a teeth portion that extends radially inward from the stator core, and
a teeth shoe that extends in a circumferential direction from an inner end of the teeth portion;
a coil disposed on the teeth portion;
a cylinder disposed on the frame;
a piston disposed in the cylinder;
an inner stator coupled to an outer circumferential surface of the piston and configured to reciprocate in the axial direction based on electromagnetic interaction with the coil;
a magnet that is disposed on the teeth shoe and faces the inner stator; and
a virtual pole that is disposed on the teeth shoe and faces the inner stator, the virtual pole being disposed in front of or behind the magnet in the axial direction, wherein the teeth shoe comprises a first teeth shoe, a second teeth shoe, a third teeth shoe, and a fourth teeth shoe that are spaced apart from one another in the circumferential direction,
wherein the magnet comprises a first magnet disposed at an inner surface of the first teeth shoe, a second magnet disposed at an inner surface of the second teeth shoe, a third magnet disposed at an inner surface of the third teeth shoe, and a fourth magnet disposed at an inner surface of the fourth teeth shoe, and
wherein the first to fourth magnets have a same polarity.

9. A linear compressor comprising:
a frame;
an outer stator comprising a plurality of core plates stacked in an axial direction, the plurality of core plates including:
a stator core disposed on the frame,
a teeth portion that extends radially inward from the stator core, and
a teeth shoe that extends in a circumferential direction from an inner end of the teeth portion;
a coil disposed on the teeth portion;
a cylinder disposed on the frame;
a piston disposed in the cylinder;
an inner stator coupled to an outer circumferential surface of the piston and configured to reciprocate in the axial direction based on electromagnetic interaction with the coil;
a magnet that is disposed on the teeth shoe and faces the inner stator; and
a virtual pole that is disposed on the teeth shoe and faces the inner stator, the virtual pole being disposed in front of or behind the magnet in the axial direction,
wherein an axial length of the virtual pole is greater than an axial length of the magnet in the axial direction.

10. A linear compressor comprising:
a frame;
an outer stator comprising a plurality of core plates stacked in an axial direction, the plurality of core plates including:
a stator core disposed on the frame,
a teeth portion that extends radially inward from the stator core, and
a teeth shoe that extends in a circumferential direction from an inner end of the teeth portion;
a coil disposed on the teeth portion;
a cylinder disposed on the frame;
a piston disposed in the cylinder;
an inner stator coupled to an outer circumferential surface of the piston and configured to reciprocate in the axial direction based on electromagnetic interaction with the coil;
a magnet that is disposed on the teeth shoe and faces the inner stator; and
a virtual pole that is disposed on the teeth shoe and faces the inner stator, the virtual pole being disposed in front of or behind the magnet in the axial direction,
wherein a sum of an axial length of the magnet and an axial length of the virtual pole is less than an axial length of the outer stator in the axial direction.

11. A linear compressor comprising:
a frame;
an outer stator comprising a plurality of core plates stacked in an axial direction, the plurality of core plates including:

a stator core disposed on the frame,
a teeth portion that extends radially inward from the stator core, and
a teeth shoe that extends in a circumferential direction from an inner end of the teeth portion;
a coil disposed on the teeth portion;
a cylinder disposed on the frame;
a piston disposed in the cylinder;
an inner stator coupled to an outer circumferential surface of the piston and configured to reciprocate in the axial direction based on electromagnetic interaction with the coil;
a magnet that is disposed on the teeth shoe and faces the inner stator; and
a virtual pole that is disposed on the teeth shoe and faces the inner stator, the virtual pole being disposed in front of or behind the magnet in the axial direction,
wherein the cylinder is radially spaced apart from the inner stator and the outer stator such that the cylinder includes no overlapping portion with the inner stator and the outer stator in a radial direction of the cylinder.

12. A linear compressor comprising:
a frame;
an outer stator comprising a plurality of core plates stacked in an axial direction, the plurality of core plates including:
a stator core disposed on the frame,
a teeth portion that extends radially inward from the stator core, and
a teeth shoe that extends in a circumferential direction from an inner end of the teeth portion, the teeth shoe comprising a step portion disposed at an inner surface thereof;
a coil disposed on the teeth portion;
a cylinder disposed on the frame;
a piston disposed in the cylinder;
an inner stator coupled to an outer circumferential surface of the piston and configured to reciprocate in the axial direction based on electromagnetic interaction with the coil; and
a magnet that is disposed at the step portion of the teeth shoe and faces the inner stator,
wherein at least a portion of the inner surface of the teeth shoe is made of a magnetic material and disposed in front of or behind the magnet in the axial direction,
wherein the teeth shoe comprises a first teeth shoe, a second teeth shoe, a third teeth shoe, and a fourth teeth shoe, and the step portion of the teeth shoe comprises a first step portion, a second step portion, a third step portion, and a fourth step portion, wherein: the first teeth shoe comprises the first step portion disposed at an inner surface thereof; the second teeth shoe comprises the second step portion disposed at an inner surface thereof; the third teeth shoe comprises the third step portion disposed at an inner surface thereof; and the fourth teeth shoe comprises the fourth step portion disposed at an inner surface thereof,
wherein the first teeth shoe, the second teeth shoe, the third teeth shoe, and the fourth teeth shoe are spaced apart from one another in the circumferential direction,
wherein the magnet comprises a first magnet disposed at the first step portion, a second magnet disposed at the second step portion, a third magnet disposed at the third step portion, and a fourth magnet disposed at the fourth step portion,
wherein the first step portion is formed in a front area of the inner surface of the first teeth shoe in the axial direction,
wherein the second step portion is formed in a rear area of the inner surface of the second teeth shoe in the axial direction,
wherein the third step portion is formed in a front area of the inner surface of the third teeth shoe in the axial direction, and
wherein the fourth step portion is formed in a rear area of the inner surface of the fourth teeth shoe in the axial direction.

13. A linear compressor comprising:
a frame;
an outer stator comprising a plurality of core plates stacked in an axial direction, the plurality of core plates including:
a stator core disposed on the frame,
a teeth portion that extends radially inward from the stator core, and
a teeth shoe that extends in a circumferential direction from an inner end of the teeth portion, the teeth shoe comprising a step portion disposed at an inner surface thereof;
a coil disposed on the teeth portion;
a cylinder disposed on the frame;
a piston disposed in the cylinder;
an inner stator coupled to an outer circumferential surface of the piston and configured to reciprocate in the axial direction based on electromagnetic interaction with the coil; and
a magnet that is disposed at the step portion of the teeth shoe and faces the inner stator,
wherein at least a portion of the inner surface of the teeth shoe is made of a magnetic material and disposed in front of or behind the magnet in the axial direction,
wherein the teeth shoe comprises a first teeth shoe, a second teeth shoe, a third teeth shoe, and a fourth teeth shoe, and the step portion of the teeth shoe comprises a first step portion, a second step portion, a third step portion, and a fourth step portion, wherein: the first teeth shoe comprises the first step portion disposed at an inner surface thereof; the second teeth shoe comprises the second step portion disposed at an inner surface thereof; the third teeth shoe comprises the third step portion disposed at an inner surface thereof; and the fourth teeth shoe comprises the fourth step portion disposed at an inner surface thereof,
wherein the first teeth shoe, the second teeth shoe, the third teeth shoe, and the fourth teeth shoe are spaced apart from one another in the circumferential direction,
wherein the magnet comprises a first magnet disposed at the first step portion, a second magnet disposed at the second step portion, a third magnet disposed at the third step portion, and a fourth magnet disposed at the fourth step portion, and
wherein the first to fourth magnets have a same polarity.

14. A linear compressor comprising:
a frame;
an outer stator comprising a plurality of core plates stacked in an axial direction, the plurality of core plates including:
a stator core disposed on the frame,
a teeth portion that extends radially inward from the stator core, and
a teeth shoe that extends in a circumferential direction from an inner end of the teeth portion;

a coil disposed on the teeth portion;
a cylinder disposed on the frame;
a piston disposed in the cylinder;
an inner stator coupled to an outer circumferential surface of the piston and configured to reciprocate in the axial direction based on electromagnetic interaction with the coil; and
a magnet that is disposed on an inner surface of the teeth shoe and faces the inner stator,
wherein the teeth shoe comprises a protrusion that is formed on the inner surface of the teeth shoe, the protrusion being made of a magnetic material and disposed in front of or behind the magnet in the axial direction,
wherein the teeth shoe comprises a first teeth shoe, a second teeth shoe, a third teeth shoe, and a fourth teeth shoe that are spaced apart from one another in the circumferential direction,
wherein the magnet comprises a first magnet disposed at an inner surface of the first teeth shoe, a second magnet disposed at an inner surface of the second teeth shoe, a third magnet disposed at an inner surface of the third teeth shoe, and a fourth magnet disposed at an inner surface of the fourth teeth shoe,
wherein the protrusion comprises a first protrusion, a second protrusion, a third protrusion, and a fourth protrusion,
wherein the first teeth shoe comprises the first protrusion formed on a rear area of the inner surface of the first teeth shoe,
wherein the second teeth shoe comprises the second protrusion formed on a front area of the inner surface of the second teeth shoe,
wherein the third teeth shoe comprises the third protrusion formed on a rear area of the inner surface of the third teeth shoe, and
wherein the fourth teeth shoe comprises the fourth protrusion formed on a front area of the inner surface of the fourth teeth shoe.

* * * * *